US011973981B2

(12) United States Patent
Jung

(10) Patent No.: US 11,973,981 B2
(45) Date of Patent: Apr. 30, 2024

(54) CODING AND DECODING OF AN OMNIDIRECTIONAL VIDEO

(71) Applicant: ORANGE, Issy-les-Moulineaux (FR)

(72) Inventor: Joel Jung, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 18/296,073

(22) Filed: Apr. 5, 2023

(65) Prior Publication Data

US 2023/0239503 A1 Jul. 27, 2023

Related U.S. Application Data

(63) Continuation of application No. 17/281,463, filed as application No. PCT/FR2019/052254 on Sep. 25, 2019, now Pat. No. 11,653,025.

(30) Foreign Application Priority Data

Oct. 1, 2018 (FR) ...................................... 1859067

(51) Int. Cl.
*H04N 19/597* (2014.01)
*H04N 19/132* (2014.01)
*H04N 19/167* (2014.01)
*H04N 19/172* (2014.01)
*H04N 19/80* (2014.01)

(52) U.S. Cl.
CPC ......... *H04N 19/597* (2014.11); *H04N 19/132* (2014.11); *H04N 19/167* (2014.11); *H04N 19/172* (2014.11); *H04N 19/80* (2014.11)

(58) Field of Classification Search
CPC .. H04N 19/597; H04N 19/132; H04N 19/167; H04N 19/172; H04N 19/80
See application file for complete search history.

(56) References Cited

U.S. PATENT DOCUMENTS

2009/0190662 A1* 7/2009 Park ...................... H04N 19/51
375/E7.123
2010/0245548 A1* 9/2010 Sasaki .................. H04N 13/183
348/51
2010/0259595 A1 10/2010 Trimeche et al.
(Continued)

OTHER PUBLICATIONS

Marek et al., 3D Video Compression by Coding of Disoccluded Regions, Sep. 2012, ICIP, 1317-1320 (Year: 2012).*
(Continued)

*Primary Examiner* — Zaihan Jiang
(74) *Attorney, Agent, or Firm* — David D. Brush; Westman, Champlin & Koehler, P.A.

(57) ABSTRACT

A process for coding an image of a view from among a plurality of views, including the following steps: selecting a first or a second coding method to code image data from the image; generating a data signal containing information indicating whether it is the first or the second coding method that has been selected, and, if it is the first coding method, coding the original image data so as to provide coded original data, and, if it is the second coding method, coding processed image data from the image obtained by image processing of the original image data so as to provide coded processed data; and coding information describing the image processing which has been applied.

13 Claims, 14 Drawing Sheets

(56) References Cited

U.S. PATENT DOCUMENTS

Figure 3A:
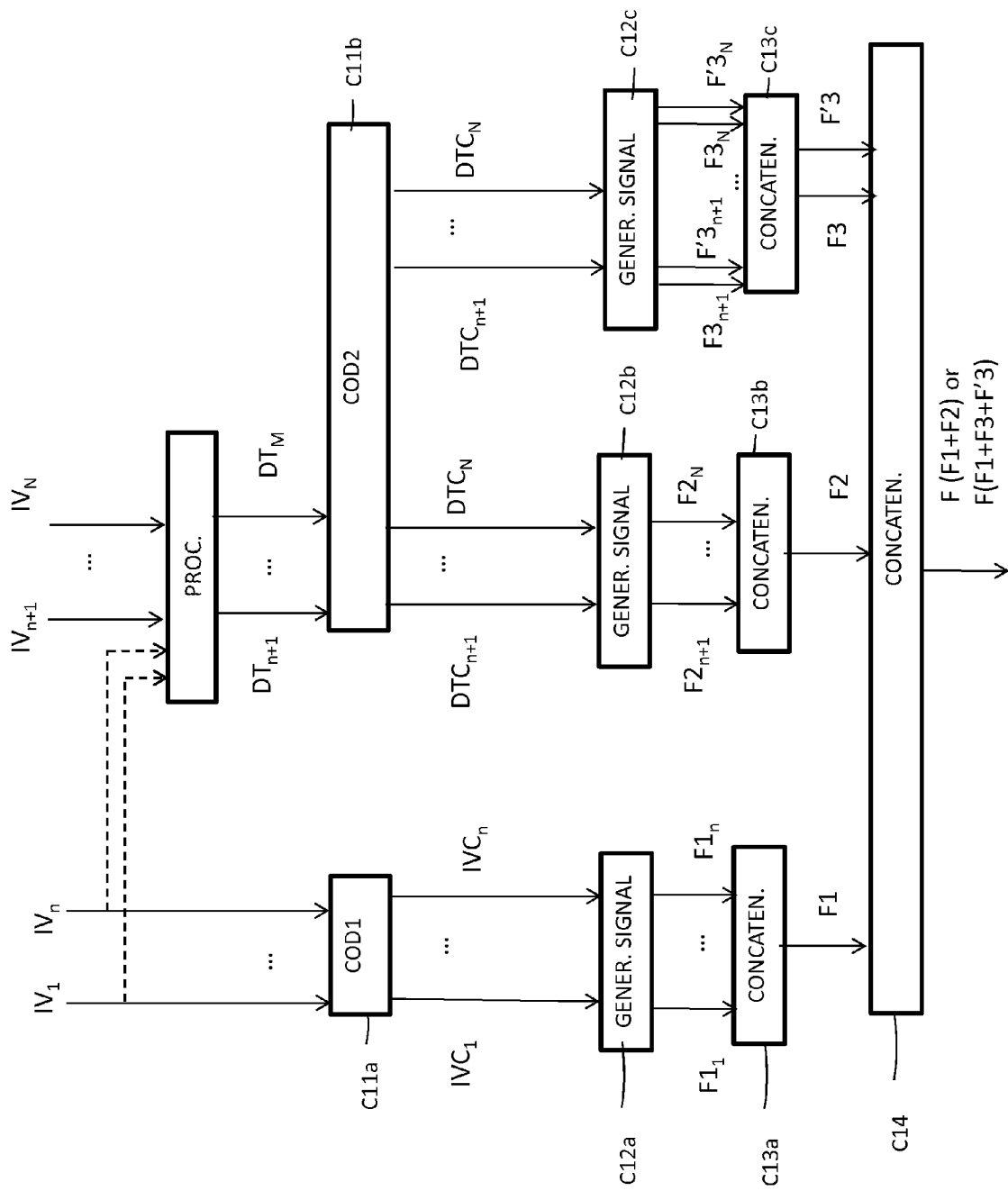

| | | | | |
|---|---|---|---|---|
| 2011/0033170 | A1* | 2/2011 | Ikeda | H04N 21/4347 386/E5.009 |
| 2011/0216162 | A1* | 9/2011 | Filippini | H04N 19/597 348/E13.001 |
| 2015/0078456 | A1* | 3/2015 | Hannuksela | H04N 19/42 375/240.01 |
| 2015/0201204 | A1* | 7/2015 | Chen | H04N 19/30 375/240.02 |
| 2015/0215600 | A1* | 7/2015 | Norkin | H04N 13/128 348/43 |
| 2015/0271486 | A1* | 9/2015 | Lin | H04N 19/103 375/240.24 |
| 2017/0081626 | A1* | 3/2017 | El Ichi | H01M 8/16 |
| 2017/0195574 | A1* | 7/2017 | Wong | H04N 23/843 |
| 2017/0195677 | A1* | 7/2017 | Ye | H04N 19/593 |

OTHER PUBLICATIONS

International Search Report dated Jan. 15, 2020 for corresponding International Application No. PCT/FR2019/052254, Sep. 25, 2019.
Written Opinion of the International Searching Authority dated Jan. 15, 2020 for corresponding International Application No. PCT/FR2019/052254, filed Sep. 25, 2019.
Jongbeom Jeong et al., "3DoF+ 360 Video Location-Based Asymmetric Down-Sampling for View Synthesis to Immersive VR Video Streaming", SENSORS, vol. 18, No. 9, Sep. 18, 2018 (Sep. 18, 2018), p. 3148, DOI: 10.3390/s18093148, XP055591982.
Marek Domanski et al., "3D video compression by coding of disoccluded regions", Image Processing (ICIP), 2012 19th IEEE International Conference on, IEEE, Sep. 30, 2012 (Sep. 30, 2012), pp. 1317-1320, DOI: 10.1109/ICIP.2012.6467110, XP032333422.
A Vetro et al., "Overview of the Stereo and Multiview Video Coding Extensions of the H.264/MPEG-4 AVC Standard", Proceedings of the IEEE, vol. 99, No. 4, Apr. 1, 2011 (Apr. 1, 2011), pp. 626-642, DOI: 10.1109/JPROC.2010.2098830, XP055132298.
Christoph Fehn et al., "Asymmetric Coding of Stereoscopic Video for Transmission Over T-DMB", 3DTV Conference, 2007, IEEE, PI, May 1, 2007 (May 1, 2007), pp. 1-4, XP031158203.
Ray Bappaditya et al., "On the possibility to achieve 6-DoF for 360 video using divergent multi-view content", 2018 26th European Signal Rocessing Conference (EUSIPCO), EURASIP, Sep. 3, 2018 (Sep. 3, 2018), pp. 211-215, DOI: 10.23919/EUSIPCO.20188553397, XP033461782.
Notice of Allowance and Fees Due for U.S. Appl. No. 17/281,463, dated Jan. 12, 2023, 10 pages.
Final Office Action for U.S. Appl. No. 17/281,463, dated Jul. 8, 2022, 40 pages.
Non-Final Office Action for U.S. Appl. No. 17/281,463, dated Jan. 20, 2022, 25 pages.
Advisory Action for U.S. Appl. No. 17/281,463, dated Oct. 3, 2022, 6 pages.

* cited by examiner

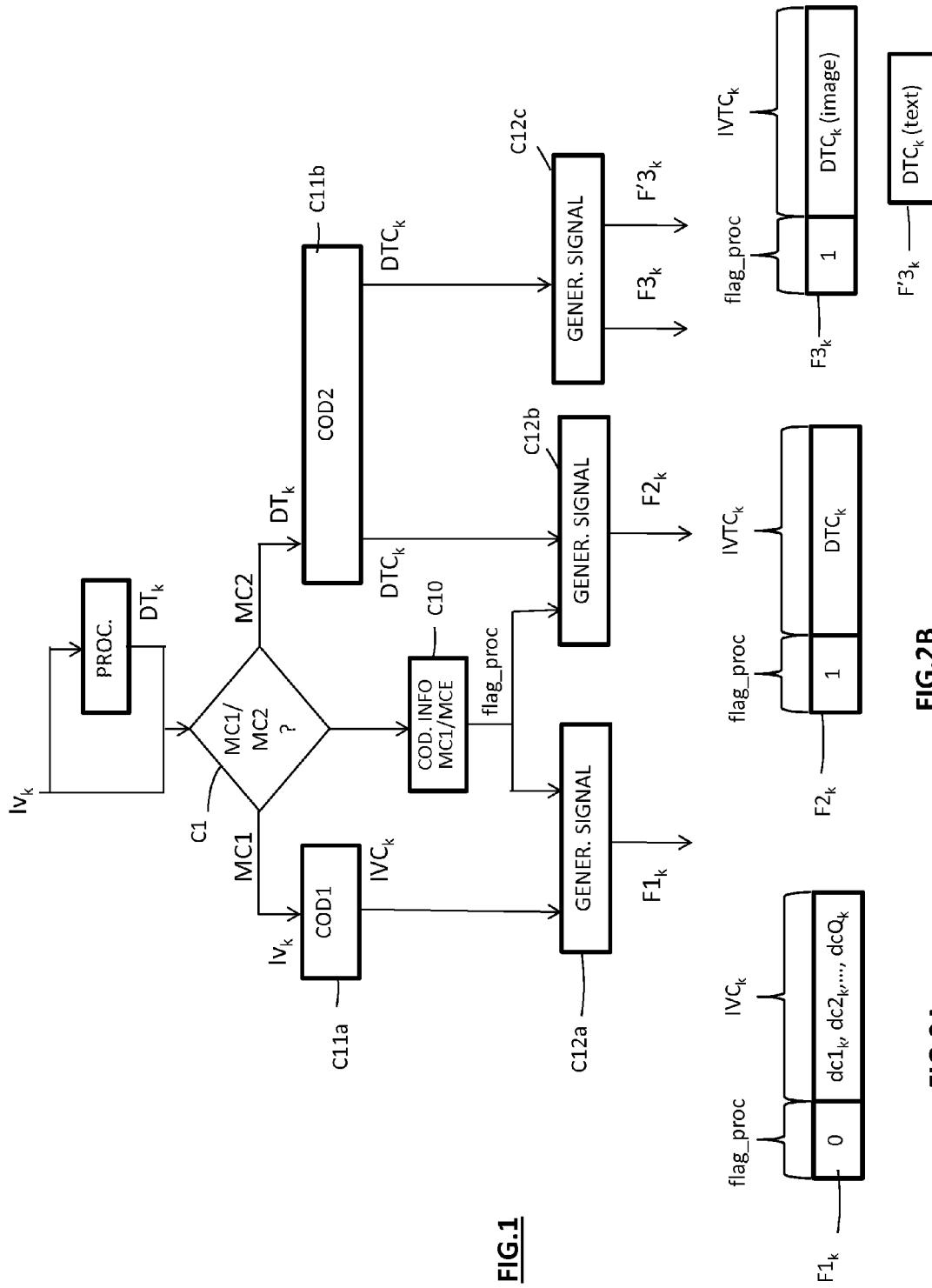

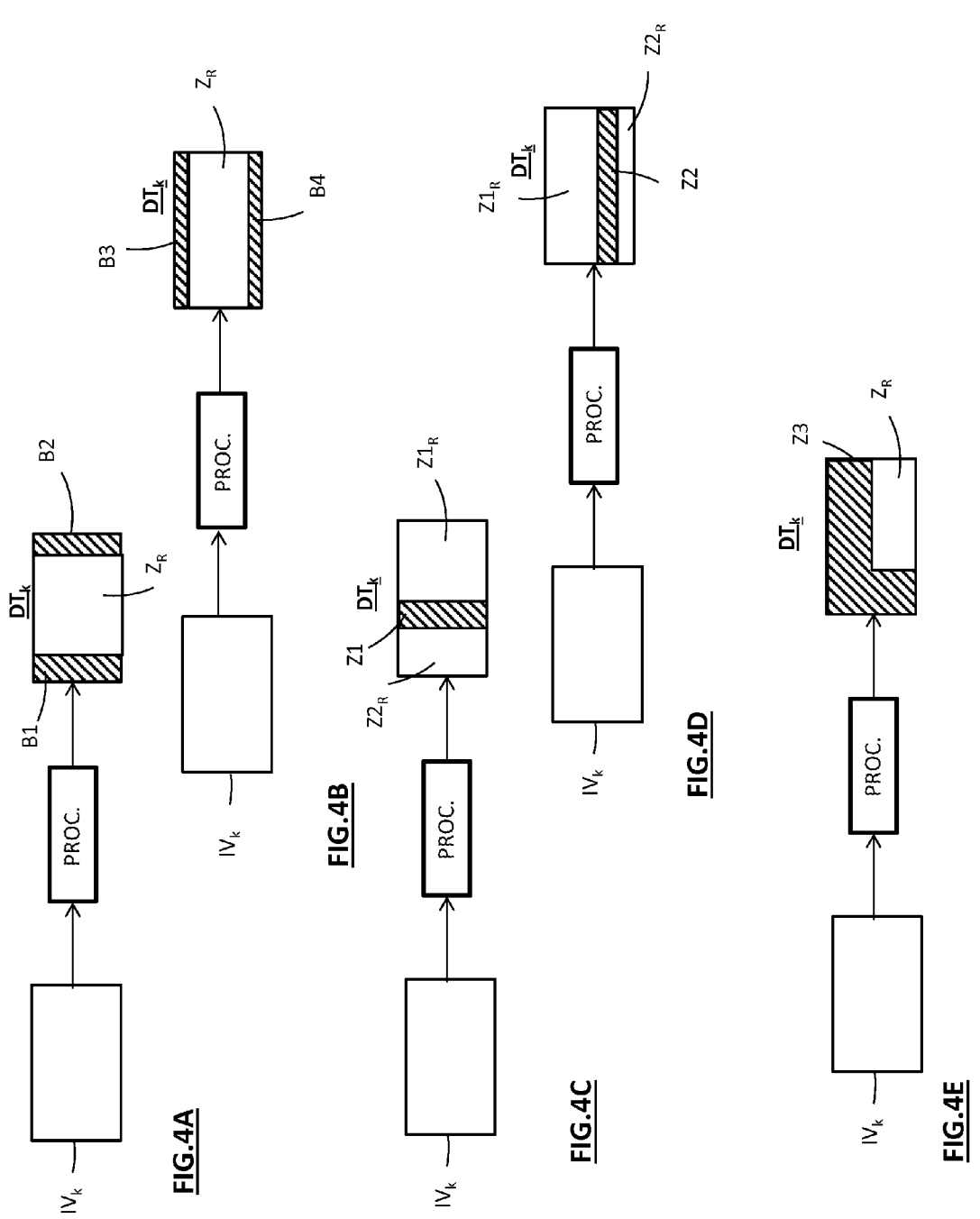

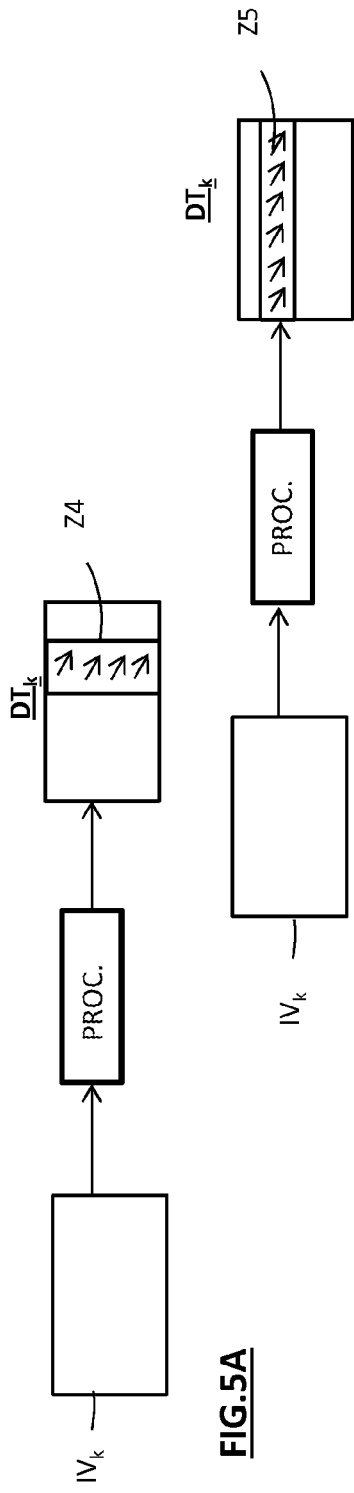
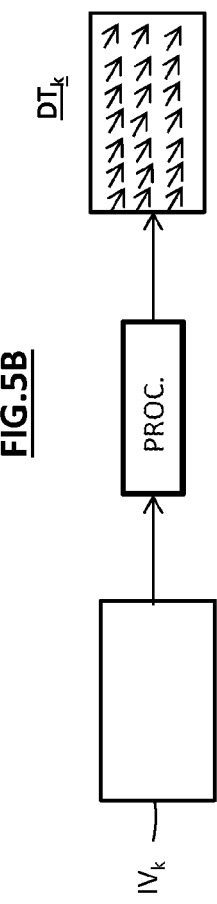
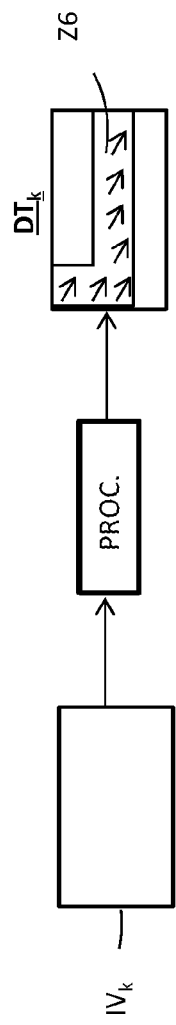
FIG.5A
FIG.5B
FIG.5C
FIG.5D

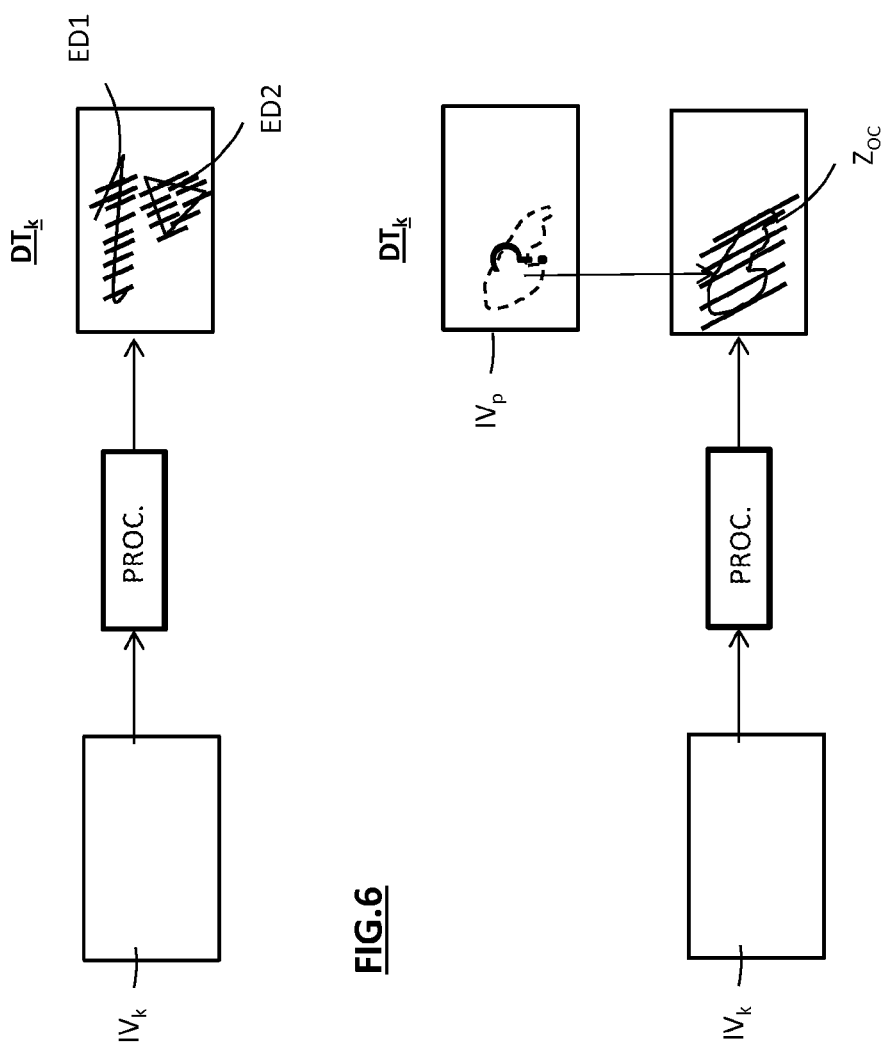

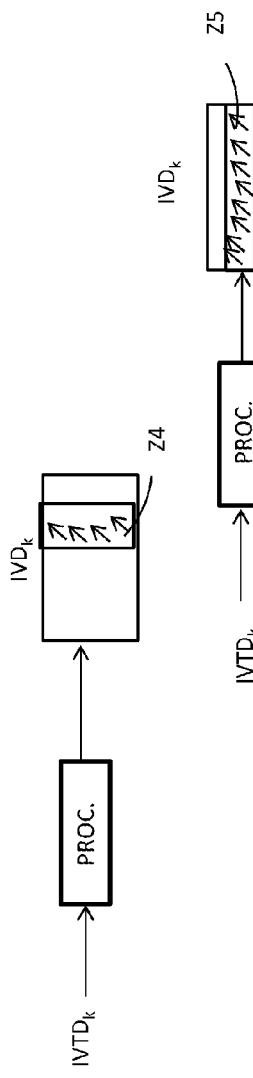
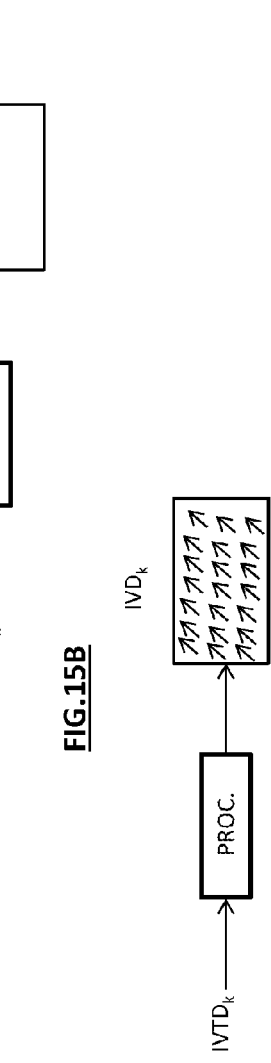
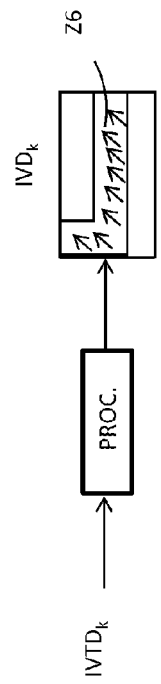
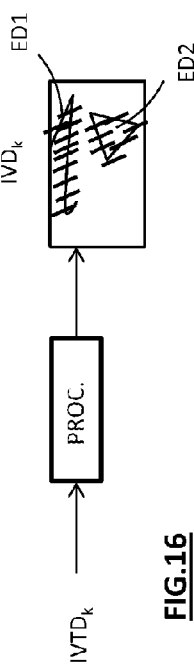
FIG.15A
FIG.15B
FIG.15C
FIG.15D
FIG.16

CODING AND DECODING OF AN OMNIDIRECTIONAL VIDEO

1. CROSS-REFERENCE TO RELATED APPLICATIONS

This application is continuation of U.S. application Ser. No. 17/281,463, filed Mar. 30, 2021, which is a Section 371 National Stage Application of International Application No. PCT/FR2019/052254, filed Sep. 25, 2019, published as WO 2020/070409 A1 on Apr. 9, 2020, not in English, the entire contents are hereby incorporated by reference in their entireties.

2. FIELD OF THE INVENTION

The present invention generally relates to the field of omnidirectional videos, such as in particular 360°, 180°, etc. videos. More particularly, the invention relates to the coding and decoding of 360°, 180°, etc. views which are captured to generate such videos, and to the synthesis of uncaptured intermediate viewpoints.

The invention may in particular, but not exclusively, be applied to the video coding implemented in AVC and HEVC current video coders and their extensions (MVC, 3D-AVC, MV-HEVC, 3D-HEVC, etc.), and to the corresponding video decoding.

3. PRIOR ART

To generate an omnidirectional video, such as for example a 360° video, it is common practice to use a 360° camera. Such a 360° camera is formed of a plurality of 2D (two-dimensional) cameras installed on a spherical platform. Each 2D camera captures a particular angle of a 3D (three-dimensional) scene, the set of views that are captured by the cameras making it possible to generate a video representing the 3D scene with a 360°×180° field of view. It is also possible to use a single 360° camera to capture the 3D scene with a 360°×180° field of view. Such a field of view may of course be smaller, for example 270°×135°.

Such 360° videos then allow the user to watch the scene as if they were positioned in the center of it and to look all around them, over 360°, thus providing a new way of watching videos. Such videos are generally reproduced on virtual reality headsets, also known as HMDs for "head mounted devices". However, they may also be displayed on 2D screens equipped with suitable user interaction means. The number of 2D cameras for capturing a 360° scene varies depending on the platforms used.

To generate a 360° video, the divergent views captured by the various 2D cameras are placed end to end, taking into account the overlaps between views, in order to create a panoramic 2D image. This step is also known as "stitching". For example, an equirectangular projection (ERP) is one possible projection for obtaining such a panoramic image. According to this projection, the views captured by each of the 2D cameras are projected onto a spherical surface. Other types of projections are also possible, such as a cube mapping-type projection (projection onto the faces of a cube). The views projected onto a surface are then projected onto a 2D plane in order to obtain a 2D panoramic image comprising, at a given time, all of the views of the scene which have been captured.

To increase the feeling of immersion, a plurality of 360° cameras of the aforementioned type may be used simultaneously to capture a scene, these cameras being positioned in the scene in an arbitrary manner. A 360° camera may be an actual camera, that is to say a physical object, or else a virtual camera, in which case the view is obtained by view generation software. In particular, such a virtual camera makes it possible to generate views representative of viewpoints of the 3D scene which have not been captured by actual cameras.

The image of the 360° view obtained using a single 360° camera or the images of 360° views obtained using a plurality of 360° cameras (actual and virtual) are then coded using, for example:
- a conventional 2D video coder, for example a coder conforming to the HEVC (abbreviation for "High Efficiency Video Coding") standard,
- a conventional 3D video coder, for example a coder conforming to the MV-HEVC and 3D-HEVC standards.

Such coders are not efficient enough in terms of compression, taking into account the very large amount of data of the image of one 360° view to be coded, let alone the images of a plurality of 360° views to be coded, and the particular geometry of the 360° representation of the 3D scene using such 360° views. Moreover, since the views captured by the 2D cameras of a 360° camera are divergent, the aforementioned coders are not suitable for coding the different images of 360° views, because inter-image prediction will be hardly or not used by these coders. Specifically, between two views captured respectively by two 2D cameras, there is little similar content that can be predicted. Therefore, all of the images of 360° views are compressed in the same way. In particular, no analysis is performed in these coders in order to determine, with respect to the image of a current 360° view to be coded, whether it makes sense to code all of the data of this image, or just some data of this image, as part of a synthesis of uncaptured intermediate view images which would use this image of the view which is coded, then decoded.

4. SUMMARY OF THE INVENTION

One subject of the present invention relates to a method for coding an image of a view forming part of a plurality of views, the plurality of views simultaneously representing a 3D scene from different viewing angles or positions, implemented by a coding device, comprising the following:
- selecting a first coding method or a second coding method for coding the image of the view,
- generating a data signal containing information indicating whether it is the first coding method or the second coding method which is selected,
- if the first coding method is selected, coding the original data of the image of the view, the first coding method providing coded original data,
- if the second coding method is selected:
  - coding processed data of the image of the view, these data having been obtained by means of an image processing applied to the original data of the image of the view, the coding providing coded processed data,
  - coding description information of the image processing which has been applied,
- the generated data signal further containing:
  - the coded original data of the image of the view, if the first coding method has been selected, the coded processed data of the image of the view, and the coded description information of the image processing, if the second coding method has been selected.

By virtue of the invention, from among a plurality of images from current views to be coded of the aforementioned type, said images representing a very large amount of data to be coded, and therefore to be signaled, it is possible to combine two coding techniques for each image of each view to be coded:

- a first coding technique, according to which the images of one or more views are coded conventionally (HEVC, MVC-HEVC, 3D-HEVC, for example), so as to obtain, respectively, reconstructed images forming views of very good quality,
- a second, innovative coding technique, according to which processed data of images of one or more other views are coded, so as to obtain, on decoding, processed image data which therefore do not correspond to the original data of these images, but with the benefit of a not-insignificant decrease in the signaling cost of the coded processed data of these images.

What will then be obtained on decoding, for each image of each other view, the processed data of which have been coded according to the second coding method, are the corresponding processed data of the image of the view, and the description information of the image processing applied, on coding, to the original data of the image of the view. Such processed data could then be processed using the corresponding image processing description information, in order to form an image of the view which, used with at least one of the images of a view reconstructed according to the first method of conventional decoding, will make it possible to synthesize images of uncaptured intermediate views, in a particularly efficient and effective manner.

The present invention also relates to a method for decoding a data signal representative of an image of a view forming part of a plurality of views, the plurality of views simultaneously representing a 3D scene from different viewing angles or positions, implemented by a decoding device, comprising the following:

on the basis of the data signal, reading an item of information indicating whether the image of the view is to be decoded according to a first or a second decoding method, if it is the first decoding method:
reading, in the data signal, coded data associated with the image of the view,
reconstructing an image of the view on the basis of the coded data that have been read, the image of the reconstructed view containing the original data of the image of the view, if it is the second decoding method:
reading, in the data signal, coded data associated with the image of the view,
reconstructing an image of the view on the basis of the coded data that have been read, the reconstructed image of the view containing processed data of the image of the view, in association with description information of an image processing used to obtain the processed data.

According to one particular embodiment:
the processed data of the image of the view are data of the image of the view which have not been deleted following the application of a cropping of the image of the view,
the description information of the image processing is information on the location, in the image of the view, of one or more cropped regions.

Such cropping processing applied to the image of said view makes it possible to avoid coding a portion of the original data thereof, with the benefit of a significant decrease in the transmission rate of the coded data associated with the image of said view, since the data belonging to the one or more regions which have been cropped are neither coded nor signaled to the decoder. The decrease in the rate will depend on the size of the one or more regions cropped. The image of the view which will be reconstructed after decoding, then potentially processing of its processed data, using the corresponding image processing description information, will therefore not contain all of its original data or at least will be different with respect to the original image of the view. Obtaining such an image of the view cropped in this way does not however harm the effectiveness of the synthesis of an intermediate image which would use such an image of said cropped view, once reconstructed. Indeed, such a synthesis using one or more images reconstructed using a conventional decoder (HEVC, MVC-HEVC, 3D-HEVC, for example), it is possible to retrieve the original region in the intermediate view, by virtue of the image of said view and conventionally reconstructed images.

According to another particular embodiment:
the processed data of the image of the view are the data of at least one region of the image of the view which has undergone a sampling, according to a given sampling factor and in at least one given direction,
the description information of the image processing comprises at least one item of information on the location, in the image of the view, of the at least one sampled region.

Such processing favors a homogeneous degradation of the image of said view, again with the aim of optimizing the decrease in the rate of the data that result from the sampling applied, and are then coded. The subsequent reconstruction of such an image of the view sampled in this way, even though it provides a reconstructed image of the view which is degraded/different from the original image of the view, the original data of which have been sampled, then coded, does not harm the effectiveness of the synthesis of an intermediate image which would use such an image of said reconstructed sampled view. Indeed, such a synthesis using one or more images reconstructed using a conventional decoder (HEVC, MVC-HEVC, 3D-HEVC, for example), it is possible to retrieve the original region corresponding to the filtered region of the image of said view, in these one or more conventionally reconstructed images.

According to another particular embodiment:
the processed data of the image of the view are the data of at least one region of the image of the view which has undergone a filtering,
the description information of the image processing comprises at least one item of information on the location, in the image of the view, of the at least one filtered region.

Such processing favors the deletion of the data of the image of said view which are considered to be unnecessary to code, with a view to optimizing the decrease in the rate of the coded data which are advantageously formed only by the filtered data of the image.

The subsequent reconstruction of such an image of the view filtered in this way, even though it provides a reconstructed image of the view which is degraded/different with respect to the original image of the view, the original data of which have been filtered, then coded, does not harm the effectiveness of the synthesis of an intermediate image which would use such an image of said reconstructed filtered view. Indeed, such a synthesis using one or more images reconstructed using a conventional decoder (HEVC, MVC-HEVC, 3D-HEVC, for example), it is possible to retrieve the original region in the intermediate view, by virtue of the filtered region of the image of said view and the conventionally reconstructed images.

According to another particular embodiment:
the processed data of the image of the view are pixels of the image of the view, corresponding to an occlusion detected using an image of another view of the plurality,
the description information of the image processing comprises an indicator of the pixels of the image of the view which are found in the image of another view.

Similar to the preceding embodiment, such processing favors the deletion of the data of the image of said view which are considered to be unnecessary to code, with a view to optimizing the decrease in the rate of the coded data which are advantageously formed only by the pixels of the image of said view, the absence of which has been detected in another image of a current view of said plurality.

The subsequent reconstruction of such an image of the view, even though it provides a reconstructed image of the view which is degraded/different with respect to the original image of the view, only the occluded region of which has been coded, does not harm the effectiveness of the synthesis of an intermediate image which would use such a reconstructed image of said view. Indeed, such a synthesis using one or more images reconstructed using a conventional decoder (HEVC, MVC-HEVC, 3D-HEVC, for example), it is possible to retrieve the original region in the intermediate view, by virtue of the image of the current view and the conventionally reconstructed images.

According to another particular embodiment:
the processed data of the image of the view, which have been coded/decoded, are pixels which are calculated:
on the basis of the original data of the image of the view,
on the basis of the original data of an image of at least one other view which is coded/decoded using the first coding/decoding method,
and potentially on the basis of the original data of an image of at least one other view, for which processed data are coded/decoded using the second coding/decoding method,
the description information of said image processing comprises:
an indicator of the pixels of the image of the view which have been calculated,
information on the location, in the image of at least one other view which has been coded/decoded using the first coding/decoding method, of the original data which have been used to calculate the pixels of the image of the view,
and potentially, information on the location, in the image of at least one other view, for which processed data have been coded/decoded, of the original data which have been used to calculate the pixels of the image of the view.

According to another particular embodiment, the processed data of an image of a first view and the processed data of an image of at least one second view are combined into a single image.

Correspondingly with respect to the above embodiment, the processed data of the image of the view which are obtained according to the second decoding method comprise the processed data of an image of a first view and the processed data of an image of at least one second view.

According to one particular embodiment:
the coded/decoded processed data of the image of the view are image-type data,
the coded/decoded description information of the image processing are image-type and/or text-type data.

The invention also relates to a device for coding an image of a view forming part of a plurality of views, the plurality of views simultaneously representing a 3D scene from different viewing angles or positions, the coding device comprising a processor which is configured to implement the following, at a current time:
selecting a first coding method or a second coding method for coding the image of the view,
generating a data signal containing information indicating whether it is the first coding method or the second coding method which is selected,
if the first coding method is selected, coding the original data of the image of the view, the first coding method providing coded original data,
if the second coding method is selected:
coding processed data of the image of the view, the processed data having been obtained by means of an image processing applied to the original data of the image of the view, the coding providing coded processed data,
coding description information of the image processing which has been applied,
the generated data signal further containing:
the coded original data of the image of the view, if the first coding method has been selected,
the coded processed data of the image of the view, and the coded description information of the image processing, if the second coding method has been selected.

Such a coding device is in particular able to implement the aforementioned coding method.

The invention also relates to a device for decoding a data signal representative of an image of a view forming part of a plurality of views, the plurality of views simultaneously representing a 3D scene from different viewing angles or positions, the decoding device comprising a processor which is configured to implement the following, at a current time:
reading, in the data signal, an item of information indicating whether the image of the view is to be decoded according to a first or a second decoding method,
if it is the first decoding method:
reading, in the data signal, coded data associated with the image of the view,
reconstructing an image of the view on the basis of the coded data that have been read, the image of the reconstructed view containing the original data of the image of the view,
if it is the second decoding method:
reading, in the data signal, coded data associated with the image of the view,
reconstructing an image of the view on the basis of the coded data that have been read, the reconstructed image of the view containing processed data of the image of the view, in association with description information of an image processing used to obtain the processed data.

Such a decoding device is in particular able to implement the aforementioned decoding method.

The invention also relates to a data signal containing data coded according to the aforementioned coding method.

The invention also relates to a computer program comprising instructions for implementing the decoding method or the coding method according to the invention, according to any one of the particular embodiments described above, when said program is executed by a processor.

This program may use any programming language and be in the form of source code, object code or intermediate code between source code and object code, such as in a partially compiled form, or in any other desirable form.

The invention also targets a computer-readable recording medium or information medium containing computer program instructions, such as mentioned above.

The recording medium may be any entity or device capable of storing the program. For example, the medium may comprise a storage means, such as a ROM, for example a CD-ROM or a microelectronic circuit ROM, or else a magnetic recording means, for example a USB key or a hard disk.

Moreover, the recording medium may be a transmissible medium such as an electrical or optical signal, which may be conveyed via an electrical or optical cable, by radio or by other means. The program according to the invention may in particular be downloaded from an Internet-type network.

Alternatively, the recording medium may be an integrated circuit in which the program is incorporated, the circuit being adapted to execute or to be used in the execution of the aforementioned coding or decoding method.

5. BRIEF DESCRIPTION OF THE DRAWINGS

Figure 3B:
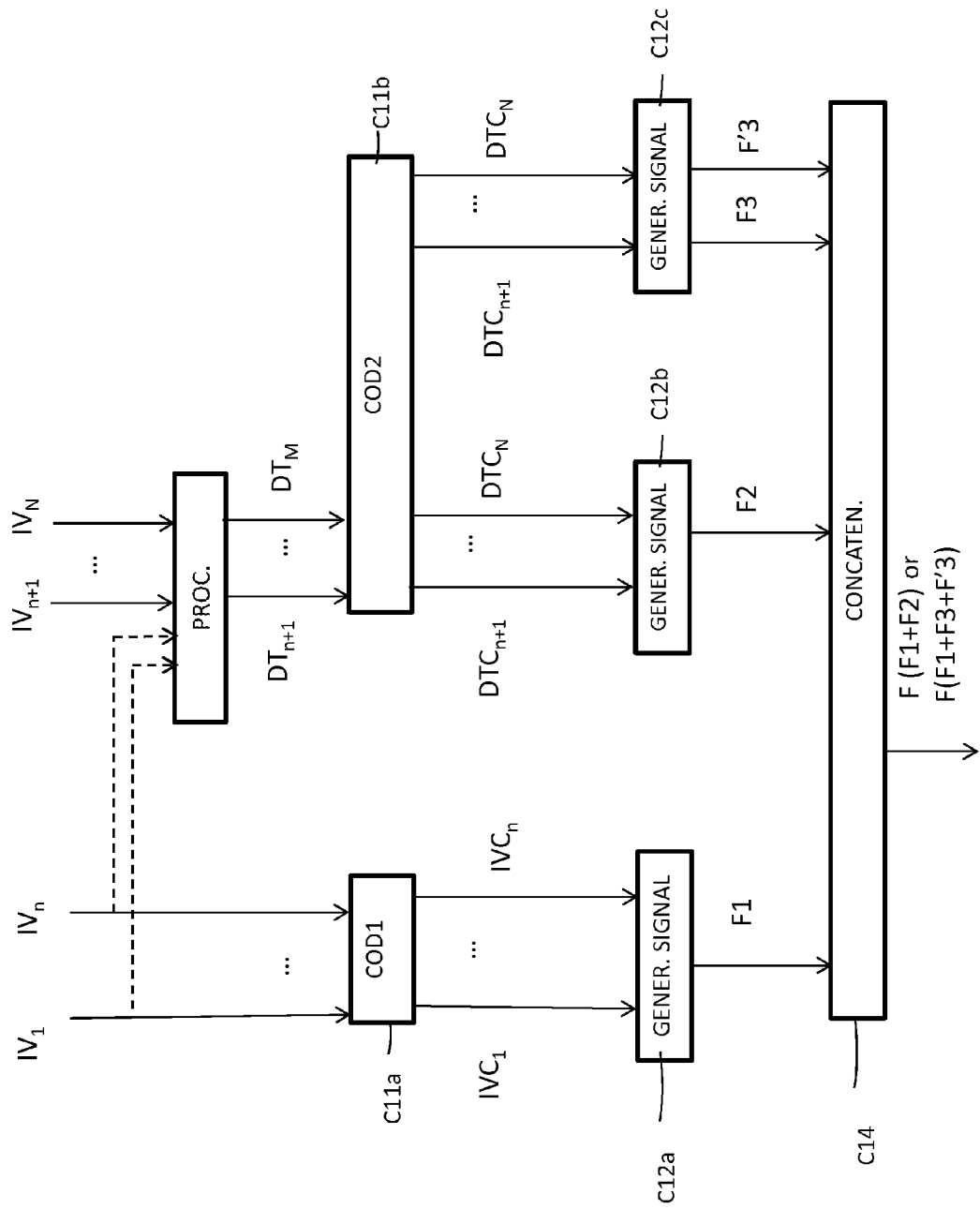
Figure 8:
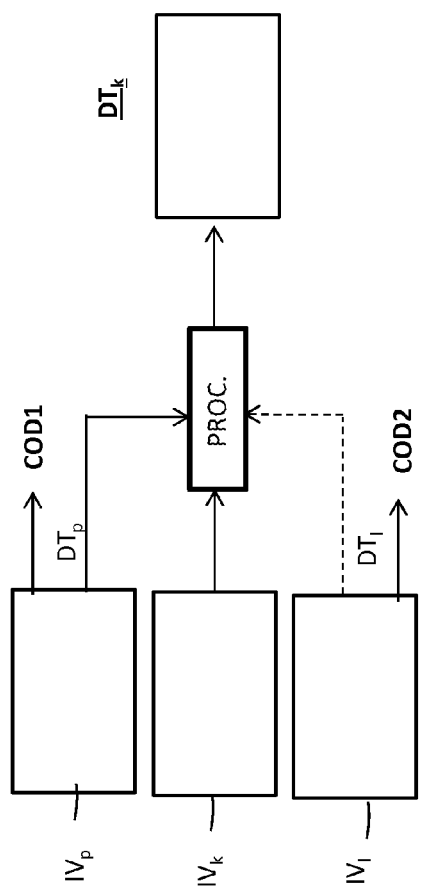
Figure 9:
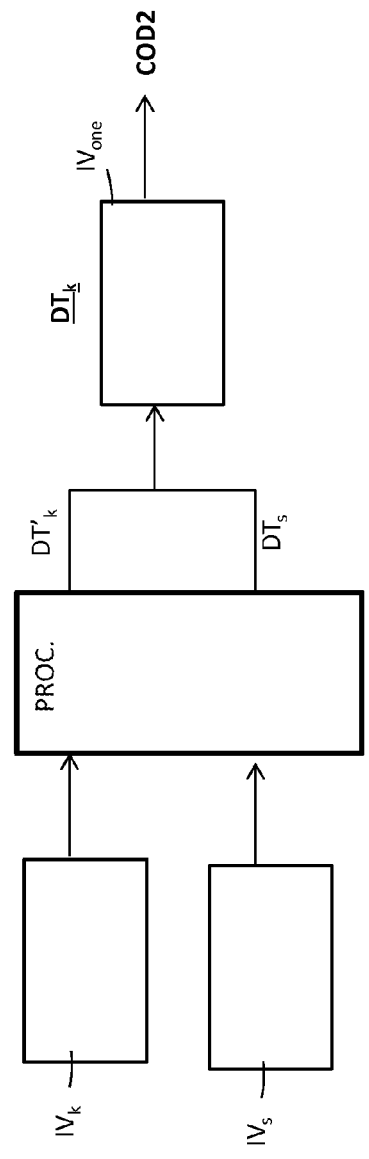
Figure 13:
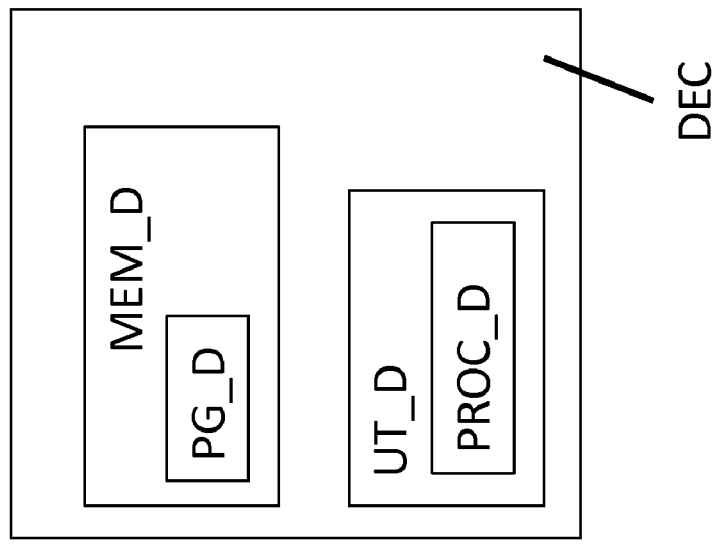
Figure 10:
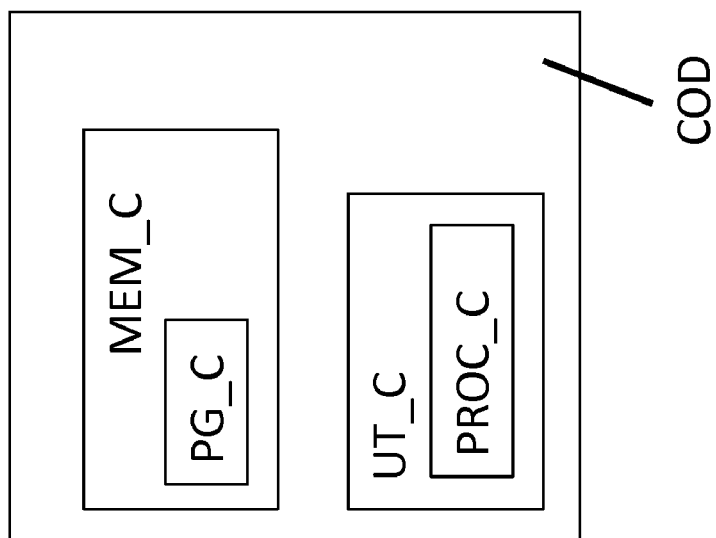
Figure 11:
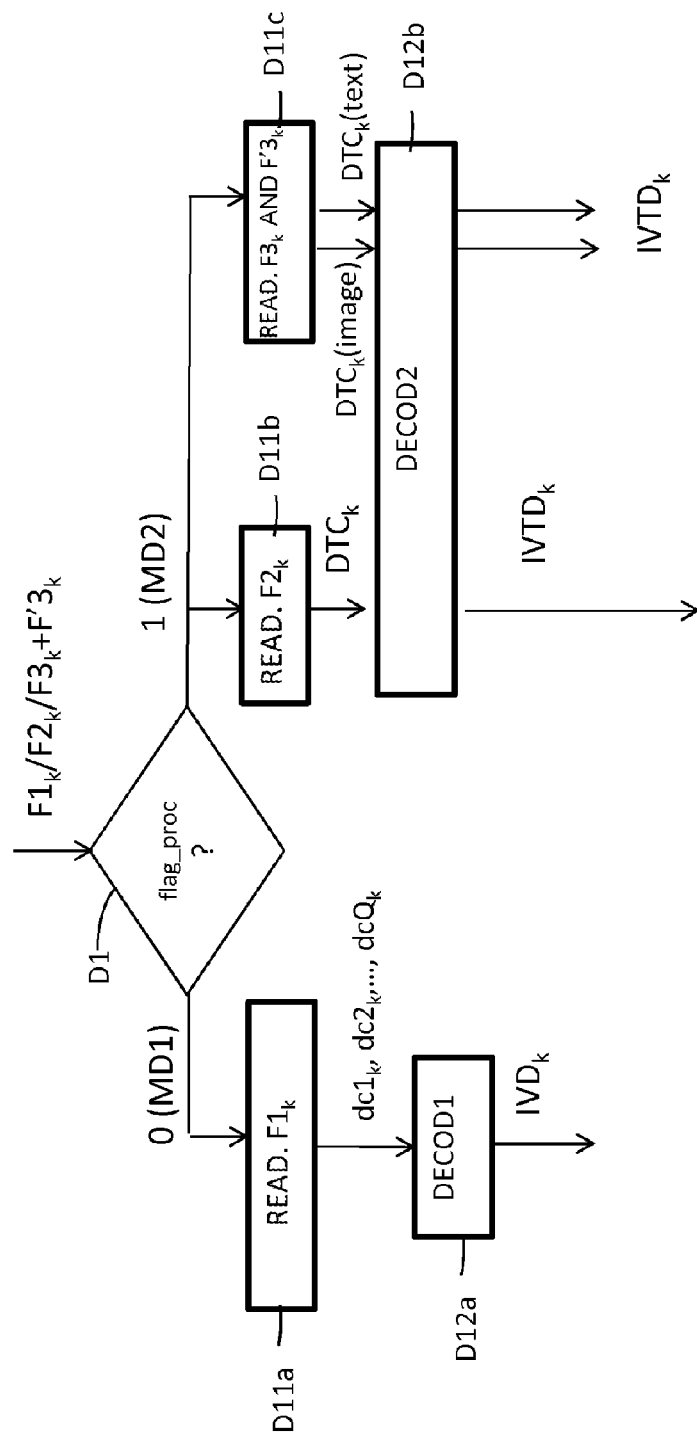
Figure 12A:
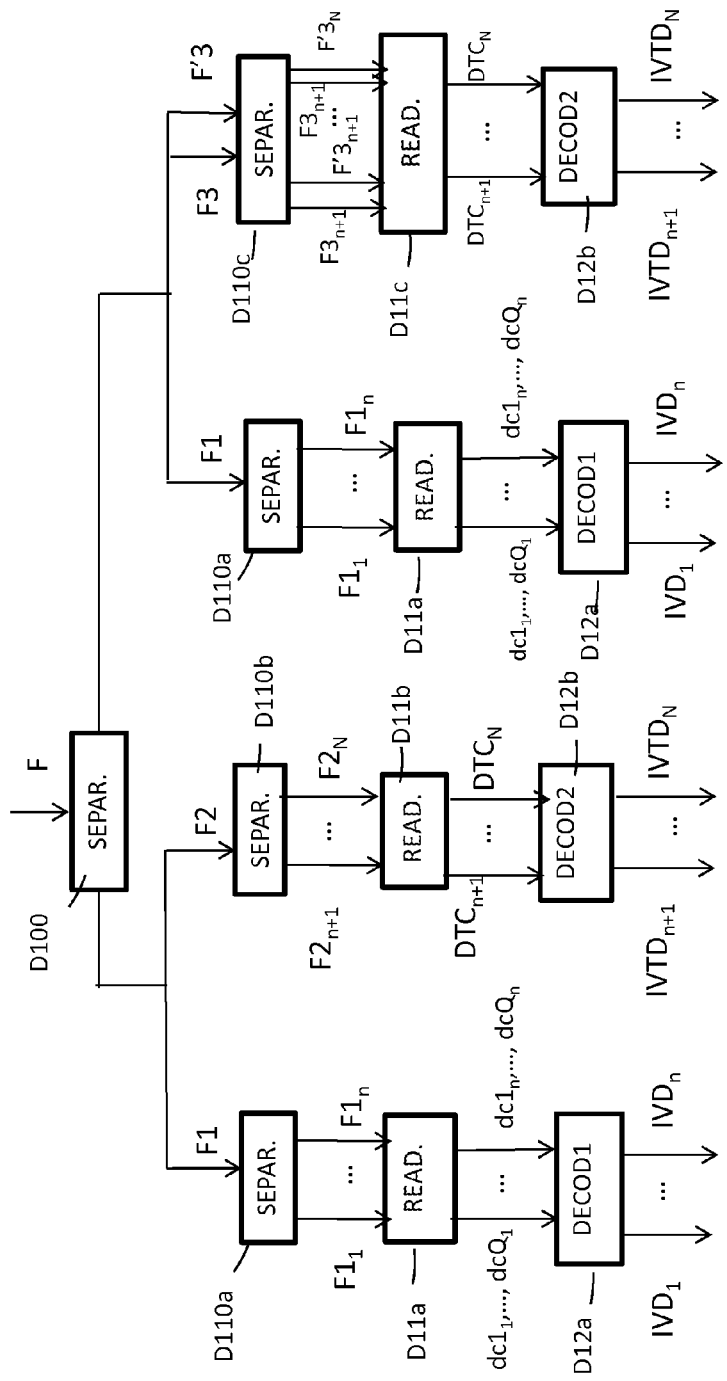
Figure 12B:
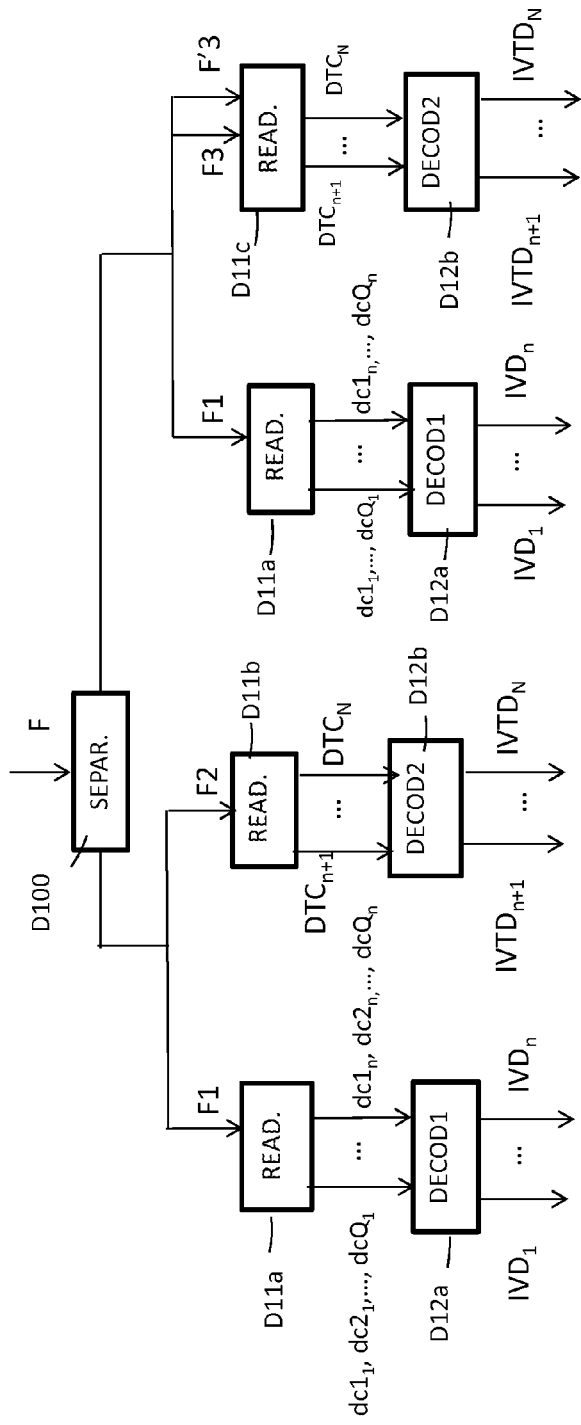
Figure 14:
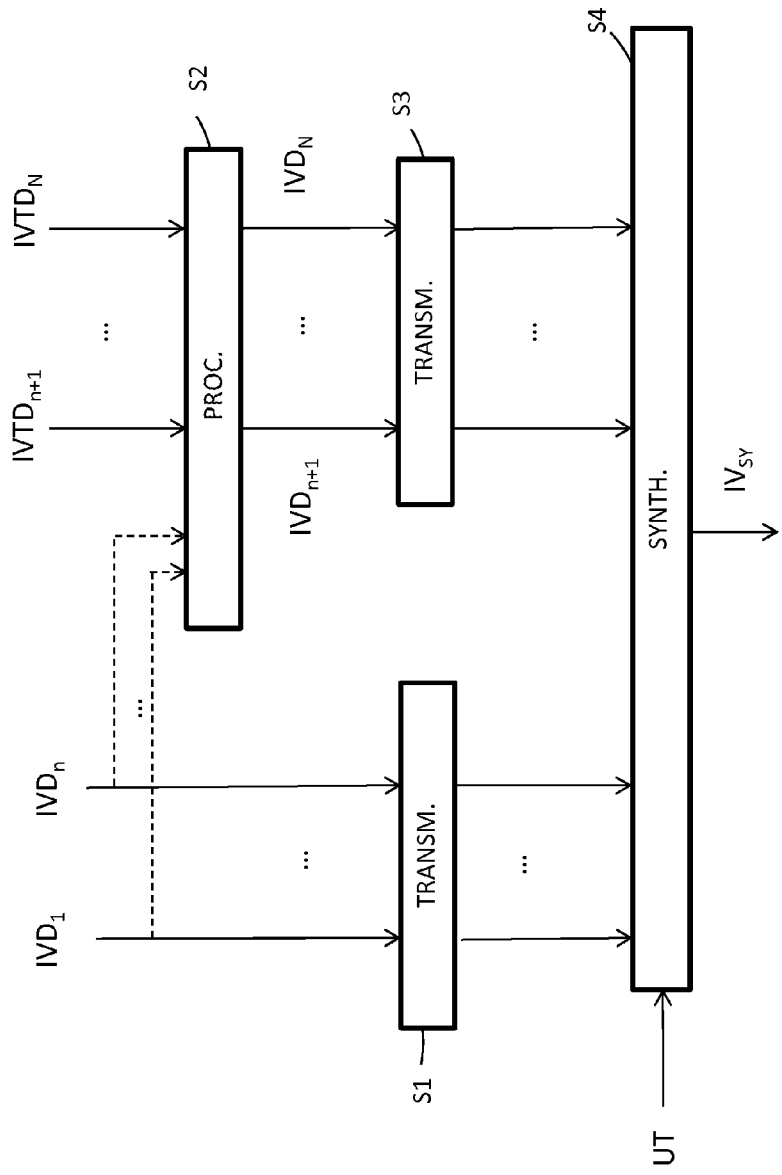
Figure 17:
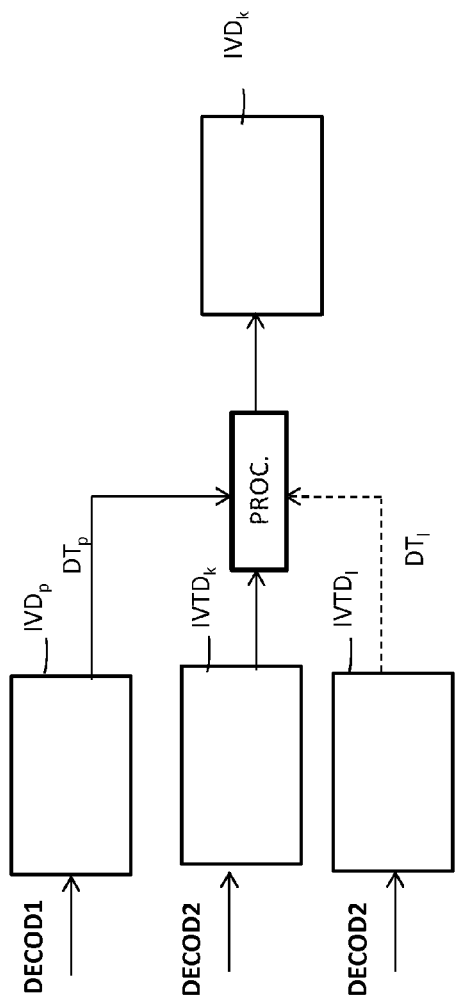
Figure 18:
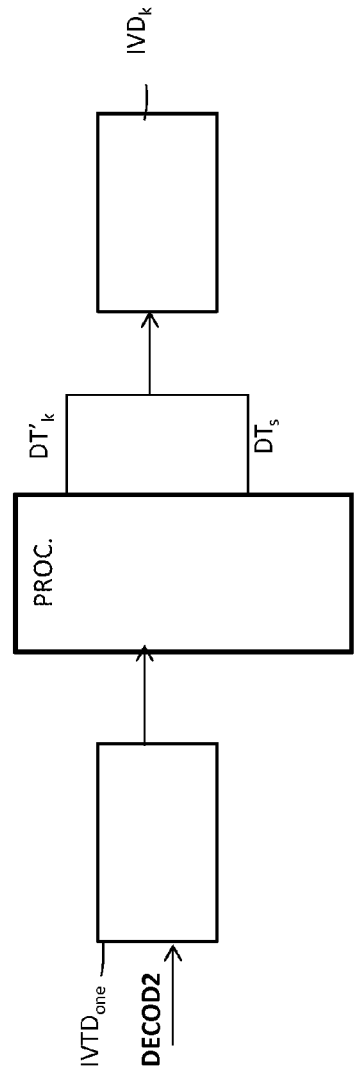

Other features and advantages will become more clearly apparent from reading several preferred embodiments, given purely by way of illustrative and non-limiting examples, and described below with reference to the appended drawings, in which:

FIG. 1 shows the main actions performed by the coding method according to one embodiment of the invention, FIG. 2A shows a first type of data signal capable of being generated following the implementation of the coding method of FIG. 1, FIG. 2B shows a second type of data signal capable of being generated following the implementation of the coding method of FIG. 1, FIG. 2C shows a third type of data signal capable of being generated following the implementation of the coding method of FIG. 1, FIG. 3A shows a first embodiment of a method for coding all of the images of views available at a current time, FIG. 3B shows a second embodiment of a method for coding all of the images of views available at a current time, FIGS. 4A to 4E each show an example of a processing applied to the image of a view, according to a first embodiment, FIGS. 5A to 5D each show an example of a processing applied to the image of a view, according to a second embodiment, FIG. 6 shows an example of a processing applied to the image of a view, according to a third embodiment, FIG. 7 shows an example of a processing applied to the image of a view, according to a fourth embodiment, FIG. 8 shows an example of a processing applied to the image of a view, according to a fifth embodiment, FIG. 9 shows an example of a processing applied to the image of a view, according to a sixth embodiment, FIG. 10 shows a coding device implementing the coding method of FIG. 1, FIG. 11 shows the main actions performed by the decoding method according to one embodiment of the invention, FIG. 12A shows a first embodiment of a method for decoding all of the images of views available at a current time, FIG. 12B shows a second embodiment of a method for decoding all of the images of views available at a current time, FIG. 13 shows a decoding device implementing the decoding method of FIG. 11, FIG. 14 shows one embodiment of a synthesis of images of views, in which images of views reconstructed according to the decoding method of FIG. 11 are used, FIGS. 15A to 15D each show an example of a processing applied to the image of a view after reconstruction thereof, according to a first embodiment, FIG. 16 shows an example of a processing applied to the image of a view after reconstruction thereof, according to a second embodiment, FIG. 17 shows an example of a processing applied to the image of a view after reconstruction thereof, according to a third embodiment, FIG. 18 shows an example of a processing applied to the image of a view after reconstruction thereof, according to a fourth embodiment.

6. DESCRIPTION OF THE GENERAL PRINCIPLE OF THE INVENTION

The invention mainly proposes a scheme for coding a plurality of current images of, respectively, a plurality of views, the plurality of views representing, at the current time, a 3D scene according to a given position or a given viewing angle, in which two coding techniques are available:

a first coding technique, according to which at least one current image of a view is coded using a conventional coding mode, such as for example HEVC, MV-HEVC, 3D-HEVC, a second, innovative coding technique, according to which the processing data of at least one current image of a view, which result from the application of a processing of the original data of this image, using a particular image processing, are coded using a conventional coding mode of the aforementioned type and/or any other suitable coding mode, so as to significantly decrease the signaling cost of the coded data of this image, resulting from the processing implemented before the coding step.

Correspondingly, the invention proposes a decoding scheme which makes it possible to combine two decoding techniques:

a first decoding technique, according to which at least one current image of a coded view is reconstructed using a conventional decoding mode, such as for example HEVC, MV-HEVC, 3D-HEVC, and corresponding to a conventional coding mode used in the coding and having been signaled to the decoder, so as to obtain at least one reconstructed image of a view which is of very good quality, a second, innovative decoding technique according to which the coded processing data of at least one image of a view are decoded using a decoding mode corresponding to the coding mode signaled to the decoder, namely either the conventional coding mode and/or the other suitable coding mode, so as to obtain processed image data and description information of the image processing from which the obtained processed data originate. The processed data obtained on decoding for this image therefore do not correspond to the original data thereof, unlike the image data decoded according to the first decoding technique.

The image of the view which will be subsequently reconstructed on the basis of such decoded processed image data and the image processing description information will be different from the original image of the view, i.e. before processing, then coding of its original data. However, such a reconstructed image of the view will constitute the image of a view which, used with images of other views reconstructed according to the first conventional decoding technique, will make it possible to synthesize images of intermediate views, in a particularly efficient and effective manner.

6.1 Exemplary Coding Scheme Implementations

A method for coding 360°, 180° or other omnidirectional videos is described below, which may use any type of multiview video coder, for example conforming to the 3D-HEVC or MV-HEVC standard, or the like.

With reference to FIG. 1, such a coding method applies to a current image of a view which forms part of a plurality of views $V_1, \ldots, V_N$, the plurality of views representing a 3D scene according to, respectively, a plurality of viewing angles or a plurality of positions/orientations.

According to a common example, in the case where three omnidirectional cameras are used to generate a video, for example a 360° video:
- a first omnidirectional camera may for example be placed in the center of the 3D scene, with a 360°×180° viewing angle,
- a second omnidirectional camera may for example be placed on the left in the 3D scene, with a 360°×180° viewing angle,
- a third omnidirectional camera may for example be placed on the right in the 3D scene, with a 360°×180° viewing angle.

According to another more atypical example, in the case where three omnidirectional cameras are used to generate an α° video, with 0°<α≤360°:
- a first omnidirectional camera may for example be placed in the center of the 3D scene, with a 360°×180° viewing angle,
- a second omnidirectional camera may for example be placed on the left in the 3D scene, with a 270°×135° viewing angle,
- a third omnidirectional camera may for example be placed on the right in the 3D scene, with a 180°×90° viewing angle.

Other configurations are of course possible.

At least two views of said plurality of views may represent the 3D scene from the same viewing angle, or not.

The coding method according to the invention consists in coding, at a current time:
- an image $IV_1$ of a view $V_1$,
- an image $IV_2$ of a view $V_2$,
- etc.,
- an image $IV_k$ of a view $V_k$,
- ...,
- an image $IV_N$ of a view $V_N$, An image of a view in question may equally be a texture image or a depth image. The image of a view in question, for example the image $IV_k$, contains an amount Q (Q≥1) of original data ($d1_k, \ldots, dQ_k$), such as for example Q pixels.

The coding method then comprises the following, for at least one image $IV_k$ of a view $V_k$, to be coded:

In C1, a first coding method MC1 or a second coding method MC2 for the image $IV_k$ is selected.

If the first coding method MC1 is selected, in C10, information flag_proc is coded, for example on a bit set to 0, to indicate that the coding method MC1 has been selected.

In C11a, the Q original data (pixels) $d1_k, \ldots, dQ_k$ of the image $IV_k$ are coded using a conventional coder, such as for example conforming to the HEVC, MV-HEVC, 3D-HEVC, etc. standard. On completion of the coding C11a, a coded image $IVC_k$ of the view $V_k$ is obtained. The coded image $IVC_k$ then contains Q coded original data $dc1_k, dc2_k, \ldots, dcQ_k$.

In C12a, a data signal $F1_k$ is generated. As shown in FIG. 2A, the data signal $F1_k$ contains the information flag_proc=0 relating to the selection of the first coding method MC1, and the coded original data $dc1_k, dc2_k, \ldots, dcQ_k$.

If the second coding method MC2 is selected, in C10, information flag_proc is coded, for example on a bit set to 1, to indicate that the coding method MC2 has been selected.

In C11b, the coding method MC2 is applied to data $DT_k$ resulting from a processing of the image $IV_k$, carried out before the coding step.

Such data $DT_k$ comprise:
- data of image type (pixels) corresponding to all or some of the original data of the image $IV_k$ which have been processed using a particular image processing, before the coding step, various detailed examples of which will be described further on in the description,
- description information of the image processing that has been applied to the image $IV_k$, before the coding step C11b, such description information being for example of text and/or image type.

On completion of the coding C11b, coded processed data $DTC_k$ are obtained. They are representative of a coded processed image $IVTC_k$.

Thus, the processed data $DT_k$ do not correspond to the original data of the image $IV_k$.

For example, these processed data $DT_k$ correspond to an image of which the resolution is higher or lower than that of the image $IV_k$ before processing. Thus, the processed image $IV_k$ could for example be larger, since it is obtained on the basis of images of other views, or conversely be smaller, since it results from the deletion of one or more original pixels from the image $IV_k$.

According to another example, these processed data $DT_k$ correspond to an image of which the format of representation (YUV, RGB, etc.) of the processed image $IV_k$ is different from the original format of the image $IV_k$ before processing, as well as the number of bits for representing a pixel (16 bits, 10 bits, 8 bits, etc.).

According to yet another example, these processed data $DT_k$ correspond to a color or texture component which is degraded with respect to the original texture or color component of the image $IV_k$ before processing.

According to yet another example, these processed data $DT_k$ correspond to a particular representation of the original content of the image $IV_k$ before processing, for example a representation of the filtered original content of the image $IV_k$.

In the case where the processed data $DT_k$ are only image data, that is to say are for example in the form of a grid of pixels, the coding method MC2 may be implemented by a coder which is similar to the coder implementing the first coding method MC1. It could be a lossy or lossless coder. In the case where the processed data $DT_k$ are different from the image data, such as for example data of text type, or else comprise both image data and data of a type other than image data, the coding method MC2 may be implemented:
- by a lossless coder in order to code specifically the data of text type,
- by a lossy or lossless coder in order to code specifically the image data, such a coder possibly being identical to the coder implementing the first coding method MC1 or else different.

In C12b, a data signal $F2_k$ is generated. As shown in FIG. 2B, the data signal $F2_k$ contains the information flag_proc=1 relating to the selection of the second coding method MC2 and the coded processed data $DTC_k$, in the case where these data are all image data.

As an alternative, in C12c, in the case where the coded processed data $DTC_k$ comprise both image data and data of text type, two signals $F3_k$ and $F'3_k$ are generated.

As shown in FIG. 2C:
- the data signal F'3 contains the information flag_proc=1 relating to the selection of the second coding method MC2 and the coded processed data $DTC_k$ of image type,
- the data signal $F'3_k$ contains the coded processed data $DTC_k$ of text type.

The coding method which has just been described above may then be implemented for each image $IV_1, IV_2, \ldots, IV_N$ of the N views to be coded that are available, for some of them only or else may be limited to the image $IV_k$, with for example k=1.

According to two exemplary embodiments shown in FIGS. 3A and 3B, it is assumed for example that among the N images $IV_1, \ldots, IV_N$ to be coded:
- the n first images $IV_1, \ldots, IV_n$ are coded using the first coding technique MC1: the n first views $V_1$ to $V_n$ are called master views because, once reconstructed, the images of the n master views will contain all of their original data and will be suitable for use with one or more of the N-n other views in order to synthesize the images of arbitrary views required by a user,
- the N-n other images $IV_{n+1}, \ldots, IV_N$ are processed before being coded using the second coding method MC2: these N-n other images processed belong to what are called additional views.

If n=0, all of the images $IV_1, \ldots, IV_N$ of all of the views are processed. If n=N−1, the image of a single view among N is processed, for example the image of the first view.

On completion of the processing of the N-n other images $IV_{n+1}, \ldots, IV_N$, M-n processed data are obtained. If M=N, there are as many processed data as there are views to be processed. If M<N, at least one of the N-n views has been deleted during the processing. In this case, on completion of the coding C11b according to the second coding method MC2, processed data relating to this image of the deleted view are coded, using a lossless coder, which comprise only information indicating the absence of this image and of this view. No pixel will then be coded, using the second coding method MC2, using a coder of HEVC, MVC-HEVC, 3D-HEVC, etc. type, for this image deleted by the processing.

In the example of FIG. 3A, in C11a, the n first images $IV_1, \ldots, IV_n$ are coded using a conventional coder of HEVC type, independently of one another. On completion of the coding C11a, n coded images $IVC_1, \ldots, IVC_n$ are respectively obtained. In C12a, n data signals $F1_1, \ldots, F1_n$ are respectively generated. In C13a, these n data signals $F1_1, \ldots, F1_n$ are concatenated, generating a data signal F1.

As represented by the dashed arrows, the images $IV_1, \ldots, IV_n$ may be used during the processing of the N-n other images $IV_{n+1}, \ldots, IV_N$.

Still with reference to FIG. 3A, in C11b, the M-n processed data $DT_{n+1}, \ldots, DT_M$ are coded using a conventional coder of HEVC type, independently of each other, if these M-n processed data are all of image type or, if they are both of image type and of text type, are coded using a conventional coder of HEVC type, independently of each other, for the processed data of image type, and are coded by means of a lossless coder for the processed data of text type. On completion of the coding C11b, N-n coded processed data $DTC_{n+1}, \ldots, DTC_N$ are obtained as, respectively, N-n coded data associated, respectively, with the N-n images $IV_{n+1}, \ldots, IV_N$. In C12b, in the case where the M-n processed data are all of image type, N-n data signals $F2_{n+1}, \ldots, F2_N$ are generated, respectively, containing, respectively, the N-n coded processed data $DTC_{n+1}, \ldots, DTC_N$. In C12c, in the case where the M-n processed data are both of image type and of text type:
- N-n data signals $F3_{n+1}, \ldots, F3_N$ are generated containing, respectively, the N-n coded processed data of image type, and
- N-n data signals $F'3_{n+1}, \ldots, F'3_N$ are generated containing, respectively, the N-n coded processed data of text type.

In C13c, the data signals $F3_{n+1}, \ldots, F3_N$ and $F'3_{n+1}, \ldots, F'3_N$ are concatenated, generating a data signal F3.

In C14, either the signals F1 and F2 are concatenated, or the signals F1 and F3 are concatenated, providing a data signal F capable of being decoded by a decoding method which will be described further on in the description.

In the example of FIG. 3B, in C11a, the n first images $IV_1, \ldots, IV_n$ are coded simultaneously using a conventional coder of MV-HEVC or 3D-HEVC type. On completion of the coding C11a, n coded images $IVC_1, \ldots, IVC_n$ are respectively obtained. In C12a, a single signal F1 is generated which contains the coded original data associated with each of these n coded images.

As represented by the dashed arrows, the first images $IV_1, \ldots, IV_n$ may be used during the processing of the N-n other images $IV_{n+1}, \ldots, IV_N$.

Still with reference to FIG. 3B, in C11b, the M-n processed data $DT_{n+1}, \ldots, DT_M$ of image type are coded simultaneously using a conventional coder of MV-HEVC or 3D-HEVC type if these M-n processed data are all of image type or, if they are both of image type and of text type, are coded simultaneously using a conventional coder of MV-HEVC or 3D-HEVC type for the processed data of image type, and are coded by means of a lossless coder for the processed data of text type. On completion of the coding C11b, N-n coded processed data $DTC_{n+1}, \ldots, DTC_N$ are obtained, respectively, as, respectively, N-n coded processed data associated, respectively, with the N-n images $IV_{n+1}, \ldots, IV_N$ which have been processed. In C12b, in the case where the M-n processed data are all of image type, a single signal F2 is generated which contains the N-n coded processed data $DTC_{n+1}, \ldots, DTC_N$ of image type. In C12c, in the case where the M-n processed data are both of image type and of text type:
- a signal F3 is generated which contains the coded processed data of image type,
- a signal F'3 is generated which contains the coded processed data of text type.

In C14, either the signals F1 and F2 are concatenated, or the signals F1, F3 and F'3 are concatenated, providing a data signal F capable of being decoded by a decoding method which will be described further on in the description.

Of course, other combinations of coding methods are possible.

According to one possible variant of FIG. 3A, the coder implementing the coding method MC1 could be a coder of HEVC type and the coder implementing the coding method MC2 could be a coder of MV-HEVC or 3D-HEVC type or else comprise a coder of MV-HEVC or 3D-HEVC type and a lossy coder.

According to one possible variant of FIG. 3B, the coder implementing the coding method MC1 could be a coder of MV-HEVC or 3D-HEVC type and the coder implementing the coding method MC2 could be a coder of HEVC type or else comprise a coder of HEVC type and a lossless coder.

A description will now be given, with reference to FIGS. 4A to 4E, of a first embodiment of a processing applied to the original data of an image $IV_k$, before the coding step C11b (FIG. 1) according to the second coding method MC2.

In the example shown in these figures, the processing applied to the original data of the image $IV_k$ is a cropping of one or more regions of this image, in a horizontal or vertical direction or else in both directions at the same time.

In the example of FIG. 4A, the left-hand border B1 and the right-hand border B2 of the image $IV_k$ are cropped, which means the deletion of the pixels of the rectangular region of the image $IV_k$ formed by each of the borders B1 and B2.

In the example of FIG. 4B, the top border B3 and the bottom border B4 of the image $IV_k$ are cropped, which means the deletion of the pixels of the rectangular region of the image $IV_k$ formed by each of the borders B3 and B4.

In the example of FIG. 4C, the cropping is applied in a vertical direction to a rectangular region Z1 located in the image $IV_k$.

In the example of FIG. 4D, the cropping is applied in a horizontal direction to a rectangular region Z2 located in the image $IV_k$.

In the example of FIG. 4E, the cropping is applied in both a horizontal and a vertical direction to a region Z3 located in the image $IV_k$.

The processed data $DT_k$ to be coded then comprise:
the pixels of the remaining region $Z_R$ of the image $IV_k$ which have not been deleted following the cropping (FIGS. 4A, 4B, 4E), or else the pixels of the remaining regions $Z1_R$ and $Z2_R$ (FIGS. 4C, 4D) of the image $IV_k$ which have not been deleted following the cropping, information describing the cropping applied.

In the case for example of FIGS. 4A, 4B, 4E, the information describing the cropping applied is of text type and contains:
the coordinates of the pixel located at the top, the furthest to the left, in the remaining region $Z_R$ of the image $IV_k$,
the coordinates of the pixel located at the bottom, the furthest to the right, in the remaining region $Z_R$ of the image $IV_k$.

In the case for example of FIGS. 4C and 4D, the information describing the cropping applied contains:
the coordinates of the pixel located at the top, the furthest to the left, in the remaining region $Z1_R$ of the image $IV_k$,
the coordinates of the pixel located at the bottom, the furthest to the right, in the remaining region $Z1_R$ of the image $IV_k$,
the coordinates of the pixel located at the top, the furthest to the left, in the remaining region $Z2_R$ of the image $IV_k$,
the coordinates of the pixel located at the bottom, the furthest to the right, in the remaining region $Z2_R$ of the image $IV_k$.

The original data (pixels) of the rectangular region defined by the coordinates of the pixel located at the top, the furthest to the left in the remaining region $Z_R$ (resp. $Z1_R$ and $Z2_R$) and the coordinates of the pixel located at the bottom, the furthest to the right, in the remaining region $Z_R$ (resp. $Z1_R$ and $Z2_R$) are then coded in C11b (FIG. 1) by a coder of HEVC, 3D-HEVC, MV-HEVC, etc. type. The description information of the cropping applied is for its part coded in C11b (FIG. 1) by a lossless coder.

As a variant, the information describing the cropping applied contains the number of rows and/or columns of pixels to be deleted, and the position of these rows and/or columns in the image $IV_k$.

According to one embodiment, the amount of data to be deleted by cropping is fixed. It may for example be decided to systematically delete X rows and/or Y columns from the image of a view in question. In this case, the description information contains only the information on the cropping or not for each view.

According to another embodiment, the amount of data to be deleted by cropping is variable between the image $IV_k$ of the view $V_k$ and an image of another view that is available.

The amount of data to be deleted by cropping may also depend for example on the position in the 3D scene of the camera which has captured the image $IV_k$. Thus, for example, if the image of another view among said N views has been captured by a camera having a position/orientation in the 3D scene that is different from that of the camera which has captured the image $IV_k$, an amount of data to be deleted that is different from the amount of data deleted for the image $IV_k$ will for example be used.

The application of a cropping may further depend on the time at which the image $IV_k$ is coded. At the current time, it may for example be decided to apply a cropping to the image $IV_k$, while at the times preceding or following the current time, it may be decided not to apply such a cropping, or any processing for that matter, to the image $IV_k$.

Finally, the cropping may be applied to the images of one or more views at the current time. The cropped region in the image $IV_k$ of the view $V_k$ may or may not be the same as the cropped region of an image of another view to be coded at the current time.

A description will now be given, with reference to FIGS. 5A to 5D, of a second embodiment of a processing applied to the original data of an image $IV_k$, before the coding step C11b (FIG. 1) according to the second coding method MC2.

In the example shown in these figures, the processing applied to the original data of the image $IV_k$ is a downsampling of one or more regions of this image, in a horizontal or vertical direction.

In the example of FIG. 5A, a downsampling is applied to a region Z4 of the image $IV_k$, in a vertical direction.

In the example of FIG. 5B, a downsampling is applied to a region Z5 of the image $IV_k$, in a horizontal direction.

In the example of FIG. 5C, a downsampling is applied to the entire image $IV_k$.

In the example of FIG. 5D, a downsampling is applied to a region Z6 of the image $IV_k$, in both a horizontal direction and a vertical direction.

The processed data $DT_k$ to be coded then comprise:
the downsampled image data (pixels),
information describing the downsampling applied, such as for example:
- the downsampling factor used,
- the downsampling direction used,
- in the case of FIGS. 5A, 5B, 5D, the location of the filtered region Z4, Z5, Z6 in the image $IV_k$ or else,
- in the case of FIG. 5C, the coordinates of the pixel located at the top, the furthest to the left, in the image $IV_k$, and the coordinates of the pixel located at the bottom, the furthest to the right, in the image $IV_k$ thus defining the complete area of this image.

The downsampled image data (pixels) are then coded in C11b (FIG. 1) by a coder of HEVC, 3D-HEVC, MV-HEVC, etc. type. The description information of the downsampling applied is for its part coded in C11b (FIG. 1) by a lossless coder.

The value of the downsampling factor may be fixed or depend on the position in the 3D scene of the camera which has captured the image $IV_k$. Thus, for example, if the image of another view among said N views has been captured by a camera having a position/orientation in the 3D scene that is different from that of the camera which has captured the image $IV_k$, another downsampling factor will for example be used.

The application of a downsampling may further depend on the time at which the image of the view $V_k$ is coded. At the current time, it may for example be decided to apply a downsampling to the image $IV_k$, while at the times preceding or following the current time, it may be decided not to apply such a downsampling, or any processing for that matter, to the image of the view $V_k$.

Finally, the downsampling may be applied to the images of one or more views at the current time. The downsampled region in the image $IV_k$ may or may not be the same as the downsampled region of an image of another view to be coded at the current time.

A description will now be given, with reference to FIG. 6, of a third embodiment of a processing applied to the original data of an image $IV_k$, before the coding step C11b (FIG. 1) according to the second coding method MC2.

In the example shown in FIG. 6, the processing applied to the original data of the image $IV_k$ is a detection of contours by filtering this image. Two contours ED1 and ED2 are for example present in an image $IV_k$. In a manner known per se, such filtering comprises, for example, the following:
- applying a contour detection filter to the contours ED1 and ED2,
- applying an expansion of the contours ED1 and ED2 so as to enlarge the region surrounding each contour ED1 and ED2, such a region being represented by hatching in FIG. 6,
- deleting all of the original data from the image $IV_k$ which do not form part of the hatched regions and which are therefore considered unnecessary to code.

The processed data $DT_k$ to be coded, in the case of such filtering, then comprise:
the original pixels which are contained in the hatched regions,
information describing the filtering applied, such as for example a predefined value for each pixel not comprised in the hatched region, represented for example by a predefined value YUV=000.

The image data (pixels) corresponding to the hatched regions are then coded in C11b (FIG. 1) by a coder of HEVC, 3D-HEVC, MV-HEVC, etc. type. The description information of the filtering applied is for its part coded in C11b (FIG. 1) by a lossless coder.

The filtering which has just been described in relation to the image $IV_k$ may be applied to one or more images of other views among said N views, to regions of these one or more images which may be different from one image of a view to another image of a view.

A description will now be given, with reference to FIG. 7, of a fourth embodiment of a processing applied to the original data of an image $IV_k$, before the coding step C11b (FIG. 1) according to the second coding method MC2.

In the example shown in FIG. 7, the processing applied to the original data of the image $IV_k$ is a detection of occlusion of at least one region $Z_{OC}$ of the image $IV_k$ using at least one image $IV_p$ of another view $V_p$ among N views ($1 \leq p \leq N$).

In a manner known per se, such an occlusion detection consists in looking for the region $Z_{OC}$ of the image $IV_k$ on the basis of the image $IV_p$, using for example a disparity estimate. The occluded region $Z_{OC}$ is then expanded, for example using a mathematical morphology algorithm. The region $Z_{OC}$ thus expanded is represented by hatching in FIG. 7. All of the original data of the image $IV_k$ which do not form part of the hatched region $Z_{OC}$ and which are therefore considered unnecessary to code are deleted.

The processed data $DT_k$ to be coded, in the case of such an occlusion detection, then comprise:
the original pixels which are contained in the hatched region,
information describing the occlusion detection applied, such as for example a predefined value for each pixel not comprised in the hatched region, represented for example by a predefined value YUV=000.

The image data (pixels) corresponding to the hatched region are then coded in C11b (FIG. 1) by a coder of HEVC, 3D-HEVC, MV-HEVC, etc. type. The description information of the occlusion detection applied is for its part coded in C11b (FIG. 1) by a lossless coder.

A description will now be given, with reference to FIG. 8, of a fifth embodiment of a processing applied to the original data of an image $IV_k$, before the coding step C11b (FIG. 1) according to the second coding method MC2.

In the example shown in FIG. 8, the processing applied to the original data of the image $IV_k$ consists in calculating pixels:
on the basis of the original pixels of the image $IV_k$,
on the basis of the original pixels of an image $IV_j$ of one or more other views ($1 \leq j \leq n$) which are coded in C11a (FIG. 1) using the first coding method MC1,
and potentially on the basis of the original pixels of an image $IV_l$ ($n+1 \leq l \leq N$) of at least one other view, for which processed pixels are coded in C11b (FIG. 1) using the second coding method MC2.

The processed data $DT_k$ to be coded, in the case of such a calculation, then comprise:
an indicator of the pixels of the image $IV_k$ of said view which have been calculated,
information on the location, in the image $IV_j$, of the original pixels which have been used to calculate the pixels of the image $IV_k$,
and potentially information on the location, in the image $IV_l$, of the original pixels which have been used to calculate the pixels of the image $IV_k$.

The aforementioned calculation consists, for example, in subtracting the original pixels of the image $IV_k$ of a view and potentially the original pixels of the image $IV_l$ from the original pixels of the image $IV_j$.

A description will now be given, with reference to FIG. 9, of a sixth embodiment of a processing applied to the original data of an image $IV_k$, before the coding step C11b (FIG. 1) according to the second coding method MC2.

In the example shown in FIG. 9, the processing applied to the original data of the image $IV_k$ consists:
- in processing the original pixels of the image $IV_k$, providing processed data $DT'_k$,
- in processing the original pixels of an image $IV_s$ of a view $V_s$ (1≤s≤N), providing processed data $DT_s$,
- in bringing together the processed data $DT'_k$ of the image $IV_k$ and the processed data $DT_s$ of the image $IV_s$ in a single image $IV_{one}$, of which the original processed data obtained $DT_k$ are coded in C11b (FIG. 1) using the second coding method MC2.

FIG. 10 shows the simplified structure of a coding device COD designed to implement the coding method according to any one of the particular embodiments of the invention.

According to one particular embodiment of the invention, the actions performed by the coding method are implemented by computer program instructions. To that end, the coding device COD has the conventional architecture of a computer and comprises in particular a memory MEM_C, a processing unit UT_C, equipped for example with a processor PROC_C, and driven by the computer program PG_C stored in memory MEM_C. The computer program PG_C comprises instructions for implementing the actions of the coding method such as described above when the program is executed by the processor PROC_C.

On initialization, the code instructions of the computer program PG_C are for example loaded into a RAM memory (not shown), before being executed by the processor PROC_C. The processor PROC_C of the processing unit UT_C implements in particular the actions of the coding method described above, according to the instructions of the computer program PG_C.

6.2 Exemplary Decoding Scheme Implementations

A method for decoding a 360°, 180° or other omnidirectional video is described below, which may use any type of multiview video decoder, for example conforming to the 3D-HEVC or MV-HEVC standard, or the like.

With reference to FIG. 11, such a decoding method applies to a data signal representative of a current image of a view which forms part of said plurality of views $V_1, \ldots, V_N$.

The decoding method according to the invention consists in decoding:
- a data signal representative of the coded data associated with the image $IV_1$ of a view $V_1$,
- a data signal representative of the coded data associated with the image $IV_2$ of a view $V_2$,
- . . . ,
- a data signal representative of the coded data associated with the image $IV_k$ of a view $V_k$,
- . . . ,
- a data signal representative of the coded data associated with the image $IV_N$ of a view $V_N$.

An image of a view in question to be reconstructed using the aforementioned decoding method may equally be a texture image or a depth image.

The decoding method comprises the following, for a data signal $F1_k$, $F2_k$ or $F3_k$ and $F'3_k$ representative of at least one image $IV_k$ of a view $V_k$, to be reconstructed:

In D1, the information flag_proc, indicating whether the image $IV_k$ has been coded using the first coding method MC1 or the second coding method MC2, is read in the data signal F1 k, $F2_k$ or $F3_k$ and $F'3_k$, as shown, respectively, in FIGS. 2A, 2B and 2C.

If it is the signal F1 k, the information flag_proc is at 0.

In D11a, the coded data $dc1_k, dc2_k, \ldots, dcQ_k$ associated with the coded image $IVC_k$ are read in the data signal F1 k.

In D12a, an image $IVD_k$ is reconstructed on the basis of the coded data $dc1_k, dc2_k, \ldots, dcQ_k$ that are read in D11a, using a decoding method MD1 corresponding to the coding method MC1 applied to the coding, in C11a in FIG. 1. To that end, the image $IV_k$ is reconstructed using a conventional decoder, such as for example conforming to the HEVC, MVC-HEVC, 3D-HEVC, etc. standard.

On completion of the decoding D12a, the image $IVD_k$ thus reconstructed contains the original data $d1_k, d2_k, \ldots, dQ_k$ of the image $IV_k$ which has been coded in C11a in FIG. 1.

Since the image $IVD_k$ is in keeping with the original image $IV_k$, it thus constitutes a master image which is suitable for use, in the context for example of a synthesis of intermediate views.

In D1, if it is the signal $F2_k$ or $F3_k$, the determined information flag_proc is at 1.

If it is the signal $F2_k$, in D11b, the coded processed data $DTC_k$ associated with the coded processed image $IVTC_k$, as obtained in C11b in FIG. 1, are read in the data signal $F2_k$.

These coded processed data $DTC_k$ that are read are only data of image type.

In D12b, a processed image $IVTD_k$ is reconstructed on the basis of the coded data $DTC_k$ that are read in D11b, using a decoding method MD2 corresponding to the coding method MC2 applied to the coding, in C11b in FIG. 1. To that end, coded data $DTC_k$ are decoded using a conventional decoder, such as for example conforming to the HEVC, MVC-HEVC, 3D-HEVC, etc. standard.

On completion of the decoding D12b, the processed image thus reconstructed $IVTD_k$, corresponding to the decoded data $DTC_k$, contains the processed data $DT_k$ of the image $IV_k$ before their coding in C11b in FIG. 1.

The reconstructed processed image $IVTD_k$ contains image data (pixels) corresponding to all or some of the original data of the image $IV_k$ which have been processed using a particular image processing, various detailed examples of which have been described with reference to FIGS. 4 to 9.

If it is the signal $F3_k$, the coded processed data $DTC_k$ associated with the coded processed image $IVTC_k$, are read in D11 c.

To that end:
- coded processed data $DTC_k$ of image type are read in the signal $F3_k$,
- coded processed data $DTC_k$, different from the image data, such as for example data of text type, or else comprising both image data and data of a type other than image data, are read in the signal $F'3_k$.

The coded processed data $DTC_k$ are decoded in D12b, using the decoding method MD2, which may be implemented:
- by a lossy or lossless decoder in order to decode specifically the image data, such a decoder possibly being identical to the decoder implementing the first decoding method MD1 or else different,
- by a lossless decoder in order to decode specifically the data of text type.

On completion of the decoding D12b, the following are obtained:

the processed image thus reconstructed $IVTD_k$, corresponding to the data $DTC_k$ of image type which have been decoded, processed data of text type corresponding to description information of the processing applied to the image $IV_k$ before the coding C11b (FIG. 1).

Such a reconstructed processed image $IVTD_k$ according to the second decoding method MD2 does not contain all of the original data of the image $IV_k$ before processing then coding in C11b. Such a reconstructed image of a view according to the second decoding method MD2 may however be used in addition to an image of a master view which will have been reconstructed using the first decoding method MD1, in the context for example of a synthesis of intermediate images, in order to obtain synthesized images of views which are of good quality.

The decoding method which has just been described above may then be implemented at the current time for each of the coded images $IVC_1$, $IVC_2$, ..., $IVC_N$ to be reconstructed that are available, for some of them only or else may be limited to the image $IV_k$, with for example k=1.

According to two exemplary embodiments shown in FIGS. 12A and 12B, it is assumed for example that among the N coded images $IVC_1$, ..., $IVC_N$ to be reconstructed:
- the n first coded images $IVC_1$, ..., $IVC_n$ are reconstructed using the first decoding technique MD1 to obtain, respectively, the image of each of the n master views,
- the N-n other coded images $IVC_{n+1}$, ..., $IVC_N$ are reconstructed using the second decoding method MD2 to obtain, respectively, the image of each of the N-n additional views.

If n=0, the images $IVC_1$, ..., $IVC_N$ of the views from 1 to N are reconstructed using the second decoding method MD2. If n=N−1, the image of a single view is reconstructed using the second decoding method MD2.

In the example of FIG. 12A, in D100, the data signal F, as generated in C14 in FIG. 3A is separated:
- either into two data signals: the data signal F1, as generated in C13a in FIG. 3A, and the data signal F2, as generated in C13b in FIG. 3A,
- or into three data signals: the data signal F1, as generated in C13a in FIG. 3A, and the data signals F3 and F'3, as generated in C13c in FIG. 3A.

In the case of the signals F1 and F2, in D110a, the data signal F1 is in turn separated into n data signals $F1_1$, ..., $F1_n$ that are representative, respectively, of the n coded images of views $IVC_1$, ..., $IVC_n$.

In D11a, in each of the n data signals $F1_1$, ..., $F1_n$, the coded original data $dc1_1$, ..., $dcQ_1$, ..., $dc1_n$, ..., $dcQ_n$ which are associated with each of these n coded images are determined, respectively.

In D12a, the images $IVD_1$, ..., $IVD_n$ are reconstructed on the basis of their respective coded original data, read in D11a, using a conventional decoder of HEVC type, independently of one another.

Still with reference to FIG. 12A, in D110b, the data signal F2 is in turn separated into N-n data signals F2n+1, ..., $F2_N$ that are representative, respectively, of the N-n coded processed data $DTC_{n+1}$, ..., $DTC_N$.

In D11b, in each of the N-n data signals F2n+1, ..., $F2_N$, N-n coded processed data $DTC_{n+1}$, ..., $DTC_N$ are read, respectively, which correspond, respectively, to each of the N-n images $IV_{n+1}$, ..., $IV_N$ to be reconstructed.

In D12b, the processed images are reconstructed, respectively, on the basis of N-n coded processed data $DTC_{n+1}$, ..., $DTC_N$ read in D11b, using a conventional decoder of HEVC type, independently of one another. The reconstructed processed images $IVTD_{n+1}$, ..., $IVTD_N$ are then obtained.

In the case of the signals F1, F3 and F'3, in D110a, the data signal F1 is in turn separated into n data signals $F1_1$, ..., $F1_n$ that are representative, respectively, of the n coded images $IVC_1$, ..., $IVC_n$.

In D11a, in each of the n data signals $F1_1$, ..., $F1_n$, the coded original data $dc1_1$, ..., $dcQ_1$, ..., $dc1_n$, ..., $dcQ_n$ which are associated with each of these n coded images are read, respectively.

In D12a, the images $IVD_1$, ..., $IVD_n$ are reconstructed on the basis of their respective coded original data, read in D11a, using a conventional decoder of HEVC type, independently of one another.

In D110c:
- the data signal F3 is in turn separated into N-n data signals F3n+1, ..., $F3_N$ that are representative, respectively, of the N-n coded processed data $DTC_{n+1}$, ..., $DTC_N$ of image type and,
- the data signal F'3 is in turn separated into N-n data signals F'3n+1, ..., $F'3_N$ that are representative, respectively, of the N-n coded processed data $DTC_{n+1}$, ..., $DTC_N$ of text or another type.

In D11c:
- in each of the N-n data signals F3n+1, ..., $F3_N$, N-n coded processed data $DTC_{n+1}$, ..., $DTC_N$ of image type are read, respectively, which correspond, respectively, to each of the N-n images $IV_{n+1}$, ..., $IV_N$ to be reconstructed,
- in each of the N-n data signals F'3n+1, ..., $F'3_N$, N-n coded processed data $DTC_{n+1}$, ..., $DTC_N$ of text or another type are read, respectively, which correspond, respectively, to the description information of the processing for each of the N-n images $IV_{n+1}$, ..., $IV_N$ to be reconstructed.

In D12b, the N-n processed images are reconstructed, respectively, on the basis of N-n coded processed data $DTC_{n+1}$, ..., $DTC_N$ read in D11b, using a conventional decoder of HEVC type, independently of one another. The reconstructed processed images $IVTD_{n+1}$, ..., $IVTD_N$ are then obtained.

Also in D12b, there is reconstructed description information of the processing applied to each of the images $IV_{n+1}$, ..., $IV_N$, before the coding thereof C11b (FIG. 3A), on the basis of N-n coded processed data $DTC_{n+1}$, ..., $DTC_N$ of text or other type read in D11 c, using a decoder corresponding to the lossless coder used in the coding.

In the example of FIG. 12B, in D100, the data signal F, as generated in C14 in FIG. 3B is separated:
- either into two data signals: the data signal F1, as generated in C12a in FIG. 3B, and the data signal F2, as generated in C12b in FIG. 3B,
- or into three data signals: the data signal F1, as generated in C12a in FIG. 3B, and the data signals F3 and F'3, as generated in C12c in FIG. 3B.

In the case of the signals F1 and F2, in D11a, in the data signal F1, the coded original data $dc1_1$, ..., $dcQ_1$, ..., $dc1_n$, ..., $dcQ_n$ are read which are associated, respectively, with each of the images $IVC_{1,\,i}$, ..., $IVC_{n,\,i}$ of n coded views.

In D12a, the images $IVD_{1,\,i}$, ..., $IVD_{n,\,i}$ are reconstructed on the basis of their respective coded original data, read in D11a, simultaneously, using a conventional decoder of MV-HEVC or 3D-HEVC type.

In D11b, in FIG. 12B, in the data signal F2, the N-n coded processed data $DTC_{n+1}$, ..., $DTC_N$ are read which are associated, respectively, with each of the images $IV_{n+1}, \ldots, IV_N$ of the N-n views to be reconstructed.

In D12b, the N-n processed images are reconstructed, respectively, on the basis of the N-n coded processed data $DTC_{n+1}, \ldots, DTC_N$, read in D11b, simultaneously, using a conventional decoder of MV-HEVC or 3D-HEVC type. The reconstructed processed images $IVTD_{n+1}, \ldots, IVTD_N$ are then obtained.

In the case of the signals F1, F3 and F'3, in D11a, in the data signal F1, the coded original data $dc1_1, \ldots, dcQ_1, \ldots, dc1_n, \ldots, dcQ_n$ are read which are associated, respectively, with each of the images $IVC_1, \ldots, IVC_n$ of the n coded views.

In D12a, the images $IVD_1, \ldots, IVD_n$ are reconstructed on the basis of their respective coded original data, read in D11a, simultaneously, using a conventional decoder of MV-HEVC or 3D-HEVC type.

In D11c, in FIG. 12B, in the data signal F3, the N-n coded processed data $DTC_{n+1}, \ldots, DTC_N$ of image type are read which are associated, respectively, with each of the N-n images $IV_{n+1}, \ldots, IV_N$ to be reconstructed.

In D12b, the processed images are reconstructed, respectively, on the basis of N-n coded processed data $DTC_{n+1}, \ldots, DTC_N$, read in D11c, simultaneously, using a conventional decoder of MV-HEVC or 3D-HEVC type. The reconstructed processed images of views $IVTD_{n+1}, \ldots, IVTD_N$ are then obtained.

Also in D12b, in FIG. 12B, there is reconstructed description information of the processing applied to each of the images $IV_{n+1}, \ldots, IV_N$, before the coding thereof C11b (FIG. 3B), on the basis of the N-n coded processed data $DTC_{n+1}, \ldots, DTC_N$ of text or other type read in D11c, and decoded using a decoder corresponding to the lossless coder used in the coding.

Of course, other combinations of decoding methods are possible.

According to one possible variant of FIG. 12A, the decoder implementing the decoding method MD1 could be a decoder of HEVC type and the decoder implementing the decoding method MD2 could be a decoder of MV-HEVC or 3D-HEVC type.

According to one possible variant of FIG. 12B, the decoder implementing the decoding method MD1 could be a decoder of MV-HEVC or 3D-HEVC type and the decoder implementing the decoding method MD2 could be a coder of HEVC type.

FIG. 13 shows the simplified structure of a decoding device DEC designed to implement the decoding method according to any one of the particular embodiments of the invention.

According to one particular embodiment of the invention, the actions performed by the decoding method are implemented by computer program instructions. To that end, the decoding device DEC has the conventional architecture of a computer and comprises in particular a memory MEM_D, a processing unit UT_D, equipped for example with a processor PROC_D, and driven by the computer program PG_D stored in memory MEM_D. The computer program PG_D comprises instructions for implementing the actions of the decoding method such as described above when the program is executed by the processor PROC_D.

On initialization, the code instructions of the computer program PG_D are for example loaded into a RAM memory (not shown), before being executed by the processor PROC_D. The processor PROC_D of the processing unit UT_D implements in particular the actions of the decoding method described above, according to the instructions of the computer program PG_D.

According to one embodiment, the decoding device DEC is for example comprised in a terminal.

6.3 Exemplary Applications of the Invention to an Image Processing

As already explained above, the N reconstructed images $IVD_1, \ldots, IVD_n$ and $IVTD_n+1, \ldots, IVTD_N$ may be used to synthesize an image of an intermediate view required by a user.

As shown in FIG. 14, in the case where a user requires the synthesis of an image of an arbitrary view, the n first reconstructed images of views $IVD_1, \ldots, IVD_n$ which are considered to be master views, are transmitted in S1 to an image synthesis module.

The N-n reconstructed processed images of views $IVTD_{n+1}, \ldots, IVTD_N$, in order to be able to be used in the synthesis of images, as additional images of the views, may need to be processed in S2, using decoded image processing description information, which are respectively associated therewith.

On completion of the processing S2, N-n reconstructed images of views $IVD_{n+1}, \ldots, IVD_N$ are obtained.

The N-n reconstructed images $IVD_{n+1}, \ldots, IVD_N$ are then transmitted in S3 to the image synthesis module.

In S4, an image of a view is synthesized using at least one of the images $IVD_1, \ldots, IVD_n$ of the n first reconstructed views and potentially at least one of the N-n images $IVD_{n+1}, \ldots, IVD_N$ of the N-n reconstructed views.

An image of a synthesized view $IV_{SY}$ is then obtained on completion of the synthesis S4.

It should be noted that the n reconstructed images $IVD_1, \ldots, IVD_n$ may also undergo a processing S2. Such a processing S2 may prove to be necessary, in the case where the user UT requires an image of a view of which the viewing angle represented does not correspond to the one or more viewing angles of the n reconstructed images $IVD_1, \ldots, IVD_n$. The user UT could for example request an image of a view representing a field of view of 120×90, whereas the n reconstructed images $IVD_1, \ldots, IVD_n$ each represent a viewing angle of 360×180. Such a possibility of processing for the reconstructed images $IVD_1, \ldots, IVD_n$ is represented by dashed arrows in FIG. 14. Additionally, in relation to the types of processing described with reference to FIGS. 8 and 9, the reconstructed images $IVD_1, \ldots, IVD_n$ may be used during the processing of the N-n other images $IV_{n+1}, \ldots, IV_N$.

A first embodiment of a processing applied to the data of a reconstructed processed image $IVTD_k$ will now be described with reference to FIGS. 15A to 15C. Such a processing consists in obtaining the initial resolution of the image $IV_k$ of the corresponding view which has been sampled before being coded in C11b in FIG. 1.

In the example of FIG. 15A, it is assumed that the processing applied before coding is a downsampling of a region Z4 of the image $IV_k$, in a vertical direction, as shown in FIG. 5A.

The processing applied to the reconstructed processed image $IVTD_k$ consists in applying an upsampling to the region Z4, corresponding to the downsampling applied in FIG. 5A, so as to return to the initial resolution of the image $IV_k$, using the information describing the downsampling applied, such as in particular:

the downsampling factor used, which makes it possible to determine the corresponding upsampling factor, the downsampling direction used, which makes it possible to determine the corresponding upsampling direction, the location of the downsampled region Z4 in the image $IV_k$.

In the example of FIG. 15B, it is assumed that the processing applied before coding is a downsampling of a region Z5 of the image $IV_k$, in a horizontal direction, as shown in FIG. 5B.

The processing applied to the reconstructed processed image $IVTD_k$ consists in applying an upsampling to the region Z5, corresponding to the downsampling applied in FIG. 5B, so as to return to the initial resolution of the image $IV_k$, using the information describing the downsampling applied, such as in particular:

the downsampling factor used, which makes it possible to determine the corresponding upsampling factor, the downsampling direction used, which makes it possible to determine the corresponding upsampling direction, the location of the downsampled region Z5 in the image $IV_k$.

In the example of FIG. 15C, it is assumed that the processing applied before coding is a downsampling of the entire image $IV_k$, as shown in FIG. 5C.

The processing applied to the reconstructed processed image $IVTD_k$ consists in applying an upsampling to all of the image data of the image $IVTD_k$, corresponding to the downsampling applied in FIG. 5C, so as to return to the initial resolution of the image $IV_k$, using the information describing the downsampling applied, such as in particular:

the downsampling factor used, which makes it possible to determine the corresponding upsampling factor, the downsampling direction used, which makes it possible to determine the corresponding upsampling direction.

In the example of FIG. 15D, it is assumed that the processing applied before coding is a downsampling of a region Z6 of the image $IV_k$, in both a horizontal direction and a vertical direction, as shown in FIG. 5D.

The processing applied to the reconstructed processed image $IVTD_k$ consists in applying an upsampling to the region Z6, corresponding to the downsampling applied in FIG. 5D, so as to return to the initial resolution of the image $IV_k$, using the information describing the downsampling applied, such as in particular:

the downsampling factor used, which makes it possible to determine the corresponding upsampling factor, the downsampling direction used, which makes it possible to determine the corresponding upsampling direction, the location of the downsampled region Z6 in the image $IV_k$.

With reference to FIG. 16, a second embodiment of a processing applied to the data of a reconstructed processed image $IVTD_k$ will now be described. Such a processing consists in restoring one or more contours of the image $IV_k$ of the view which has been filtered before coding of the latter.

In the example of FIG. 16, it is assumed that the processing applied before coding is a filtering of the contours ED1 and ED2 of the image $IV_k$, as shown in FIG. 6.

The processing applied to the image of the reconstructed processed view $IVTD_k$ then consists in restoring the contours ED1 and ED2 of the image $IV_k$, using the information describing the filtering applied, such as in particular the predefined value for each unfiltered pixel, in particular the predefined value YUV=000.

With reference to FIG. 17, a third embodiment of a processing applied to the data of a reconstructed processed image $IVTD_k$ will now be described. Such a processing consists in reconstructing pixels of the image $IV_k$ of the view which, before coding, have been calculated in accordance with the embodiment of the processing of FIG. 8.

The processing applied to the reconstructed processed image $IVTD_k$ then consists:

in retrieving pixels of the image $IV_k$ of the view which have been calculated in the coding, using an indicator of the pixels of the image $IV_k$ of said view which have been calculated, such an indicator being read in the data signal, in retrieving pixels of an image of at least one other view $IV_j (1 \leq j \leq n)$ which has been reconstructed using the first decoding method MD1, using the information on the location, in the image $IV_j$, of the pixels which have been used to calculate the pixels of the image $IV_k$, and potentially in retrieving pixels of an image $IV_l$ ($n+1 \leq l \leq N$) of at least one other view, for which processed pixels have been decoded using the second decoding method MD2.

The decoding of the processed data $DT_k$ then consists in calculating the pixels of the image $IV_k$:

on the basis of the pixels of the image of at least one other view $IV_j (1 \leq j \leq n)$, and potentially on the basis of the pixels of the image $IV_l$ ($n+1 \leq l \leq N$) of at least one other view.

The aforementioned calculation consists for example in combining the pixels of the image $IV_k$ with the pixels of the reconstructed image $IV_j$ and potentially with the pixels of the reconstructed image $IV_l$.

With reference to FIG. 18, a fourth embodiment of a processing applied to the data of a reconstructed processed image $IVTD_k$ will now be described. Such a processing consists in reconstructing pixels of the image $IV_k$ of the view which, before coding, have been calculated in accordance with the embodiment of the processing of FIG. 9.

A processing is first applied to the reconstructed image $IVD_{one}$ according to the second decoding method MD2. It then consists in reconstructing, on the basis of the image $IVD_{one}$, the pixels of the image $IV_k$:

on the basis of the processed data $DT'_k$ of the image $IV_k$ which have been decoded according to the second decoding method MD2, on the basis of the processed data $DT_s$ of an image $IVD_s$ of a view $V_s$ ($1 \leq s \leq N$), which have been decoded.

6.4 Exemplary Concrete Applications of the Invention

According to a first example, it is considered that six images of the views with a resolution of 4096×2048 pixels are captured, respectively, by six cameras of 360° type. A depth estimation method is applied to provide six corresponding 360° depth maps.

The image IV0, of the view V0, is coded conventionally using the first coding method MC1, while the five other images IV1, IV2, IV3, IV4, IV5 of the views V1, V2, V3, V4, V5 undergo a cropping before coding. The processing applied to each of the images IV1, IV2, IV3, IV4, IV5 consists in removing a fixed number of columns, for example 200, on the right and on the left of each of these images. The number of columns to be removed has been selected such that the viewing angle is reduced from 360° to 120°. Similarly, the processing applied to each of the images IV1, IV2, IV3, IV4, IV5 consists in deleting a fixed number of rows, for example 100, from the top and bottom portions, respectively, of each of these images. The number of rows to be deleted has been selected such that the viewing angle is reduced from 180° to 120°.

An item of information flag_proc is set to 0, in association with the image IV0, and an item of information flag_proc is set to 1, in association with the images IV1, IV2, IV3, IV4, IV5.

The image of the view IV0 is coded using an HEVC coder. A single data signal $F1_0$ is generated, said data signal containing the coded original data of the image IV0, and the information flag_proc=0.

The data of the regions remaining after cropping of each of the images IV1, IV2, IV3, IV4, IV5 are coded using an HEVC coder. Five data signals $F2_1$, $F2_2$, $F2_3$, $F2_4$, $F2_5$, which contain, respectively, the coded data of the regions remaining after cropping of each of the images IV1, IV2, IV3, IV4, IV5, in association with the information flag_proc=1, are generated. The data signals $F1_0$, $F2_1$, $F2_2$, $F2_3$, $F2_4$, $F2_5$ are concatenated, then transmitted to a decoder.

The five data signals $F2_1$, $F2_2$, $F2_3$, $F2_4$, $F2_5$ may additionally comprise the coordinates of the cropped regions in the following way:

IV1, IV2, IV3, IV4, IV5: flag_proc=1, point top_left (h, v)=(0+200, 0+100), point bot_right (h, v)=(4096-200, 2048-100), with "h" for horizontal and "v" for vertical.

At the decoder, the information flag_proc is read.

If flag_proc=0, the image of the view IV0 is reconstructed using an HEVC decoder.

If flag_proc=1, the images IV1, IV2, IV3, IV4, IV5, corresponding to the coded processed data, are reconstructed using an HEVC decoder. No processing is applied to the images IV1, IV2, IV3, IV4, IV5 which have been reconstructed because it is not possible to reconstruct the data of these images which have been deleted by cropping. However, a synthesis algorithm uses the six images IV0, IV1, IV2, IV3, IV4, IV5 which have been reconstructed in order to generate an image of an arbitrary view required by a user.

In the case where the five data signals $F2_1$, $F2_2$, $F2_3$, $F2_4$, $F2_5$ additionally comprise the coordinates of the cropped regions, these coordinates are used by the synthesis algorithm to generate an image of a view required by a user.

According to a second example, 10 images IV0, . . . , IV9 with a respective resolution 4096×2048 pixels are considered which are generated by computer in order to simulate 10 cameras of 360° type. It is decided not to process the images IV0 and IV9. The texture components of the images IV1 to IV8 undergo for their part a downsampling by a factor of 2 in the horizontal direction and by a factor of 2 in the vertical direction and the corresponding depth components undergo for their part a downsampling by a factor of 4 in the horizontal direction and by a factor of 4 in the vertical direction. As a result, the resolution of the texture components of the images IV1 to IV8 becomes 2048×1024 and the resolution of the depth components of the images IV1 to IV8 becomes 1024×512.

The processing data, such as the image data relating to the images IV1 to IV8 contain the 8 downsampled texture components of resolution 2048×1024 of the images IV1 to IV8 and the 8 downsampled depth components of resolution 1025×512 of the images IV1 to IV8.

Additionally, the aforementioned processing data contain data of text type which indicate the downsampling factors for each image IV1 to IV8 of the views 1 to 8. They are written as follows:

IV1 to IV8 texture: se_h=2, se_v=2 ("se" for downsampling, "h" for horizontal and "v" for vertical),
IV1 to IV8 depth: se_h=4, ss_v=4.

An item of information flag_proc is set to 0, in association with the images IV0 and IV9, and an item of information flag_proc is set to 1, in association with the images IV1 to IV8.

The images IV0 and IV9 are coded simultaneously using a coder of MV-HEVC type, which generates a single data signal F1 containing the information flag_proc=0 and the coded original data of the images IV0 and IV9.

The processing data, such as the image data relating to the images IV1 to IV8, containing the 8 downsampled texture components of resolution 2048×1024 of the images IV1 to IV8 and the 8 downsampled depth components of resolution 1025×512 of the images IV1 to IV8, are also coded simultaneously, using a coder of MV-HEVC type, which generates a single data signal F2 containing the information flag_proc=1, in association with the coded downsampled texture and depth data. The data of text type which indicate the downsampling factors for each image IV1 to IV8 of the views 1 to 8 are for their part coded losslessly. The data signals F1 and F2 are concatenated, then transmitted to a decoder.

At the decoder, the information flag_proc is read.

If flag_proc=0, the images IV0 and IV9 are reconstructed simultaneously using an MV-HEVC decoder. Reconstructed images IVD0 and IVD9 which are at their initial resolution are then obtained.

If flag_proc=1, the images $IV_1$ to IV8, corresponding to their respective coded downsampled texture and depth data, are reconstructed simultaneously using an MV-HEVC decoder. Reconstructed downsampled images IVDT1 to IVDT8 are then obtained. The data of text type corresponding to each of the 8 images $IV_1$ to IV8 are also decoded, providing the downsampling factors which have been used for each image IV1 to IV8.

The reconstructed downsampled images IVDT1 to IVDT8 are then processed using their corresponding downsampling factors. On completion of the processing, reconstructed images IVD1 to IVD8 are obtained, the 8 respective texture components of which are at their initial resolution 4096×2048 and the 8 respective depth components of which are at their initial resolution 4096×2048.

A synthesis algorithm uses the images of the 10 views thus reconstructed at their initial resolution, in order to generate an image of a view required by a user.

According to a third example, 3 images IV0 to $IV_2$ with a respective resolution 4096×2048 pixels are considered which are generated by computer in order to simulate 4 cameras of 360° type. 3 texture components and 3 corresponding depth components are then obtained. It is decided not to process the image IV0 and to extract occlusion maps for the images IV1 and IV2, respectively. To that end, a disparity estimate is made between the image IV1 and the image IV0 so as to generate the occlusion mask of the image IV1, that is to say the pixels of the image IV1 which are not found in the image IV0. A disparity estimate is also made between the image IV2 and image IV0 so as to generate the occlusion mask of the image IV2.

The processing data, such as the image data relating to the images IV1 and IV2 contain the 2 texture components of the occlusion masks of the images IV1 and IV2 and the 2 depth components of the occlusion masks of the images IV1 and IV2.

An item of information flag_proc is set to 0, in association with the image IV0, and an item of information flag_proc is set to 1, in association with the images IV1 and IV2.

The image IV0 is coded using an HEVC coder. A single data signal $F1_0$ is generated, said data signal containing the coded original data of the image IV0, and the information flag_proc=0.

The image data (texture and depth) of the occlusion masks of each of the images IV1, IV2 are coded using an HEVC coder. Two data signals $F2_1$, $F2_2$, which contain, respectively, the coded image data of the occlusion masks of each of the images IV1, IV2, in association with the information flag_proc=1, are generated. The data signals $F1_0$, $F2_1$, $F2_2$ are concatenated, then transmitted to a decoder.

At the decoder, the information flag_proc is read.

If flag_proc=0, the image IV0 is reconstructed using an HEVC decoder.

If flag_proc=1, the images IV1, IV2, corresponding to the coded image data (texture and depth) of the occlusion masks of each of the images IV1, IV2, are reconstructed using an HEVC decoder. No processing is applied to the images IV1, IV2 which have been reconstructed because it is not possible to reconstruct the data of these images which have been deleted on completion of the occlusion detection. However, a synthesis algorithm may use the images IV0, IV1, IV2 which have been reconstructed in order to generate an image of a view required by a user.

According to a fourth example, it is considered that two images IV0 and IV1 with a resolution of 4096×2048 pixels are captured, respectively, by two cameras of 360° type. The image IV0 of the first view is coded conventionally using the first coding method MC1, while the image IV1 of the second view is processed before being coded according to the second coding method MC2. Such a processing comprises the following:
  extracting the contours of the image IV1, using a filter, such as for example a Sobel filter,
  applying an expansion to the contours, for example using a mathematical morphology operator, in order to increase the region around the contours.

The processing data, such as the image data relating to the image IV1, comprise the pixels inside the region around the contours, and pixels set to 0 corresponding, respectively, to the pixels located outside the region around the contours.

Additionally, data of text type are generated, for example in the form of marking information (e.g.: YUV=000) which indicates the setting to 0 of the pixels located outside the region around the contours. The pixels set to 0 will be neither coded nor signaled to the decoder.

The image IV0 is coded using an HEVC coder, which generates a data signal F1 containing the information flag_proc=0 and the coded original data of the image IV0.

The image data of the region around the contours of the image IV1 are coded using an HEVC coder, while the marking information is coded using a lossless coder. A data signal F2 is then generated, said signal containing the information flag_proc=1, the coded pixels of the region around the contours of the image IV1 and the item of coded marking information.

At the decoder, the information flag_proc is read.

If flag_proc=0, the image IV0 is reconstructed using an HEVC decoder, at its original resolution.

If flag_proc=1, the image IV1, corresponding to the image data of the region around the contours of the image IV1, is reconstructed by means of an HEVC decoder, using the marking information which makes it possible to restore the value set to 0 of the pixels surrounding said region.

A synthesis algorithm may use the two images IV0 and IV1 which have been reconstructed in order to generate an image of a view required by a user.

According to a fifth example, it is considered that four images IV0 to IV3 with a resolution of 4096×2048 pixels are captured, respectively, by four cameras of 360° type. The image IV0 is coded conventionally using the first coding method MC1, while the images IV1 to IV3 are processed before being coded according to the second coding method MC2. Such a processing is a filtering of the images IV1 to IV3, during which a region of interest ROI is calculated. A region of interest contains the one or more regions of each image IV1 to IV3 which are considered the most relevant, for example because they contain many details.

Such a filtering is carried out according for example to one of the two methods below:
  calculating saliency maps of each image IV1 to IV3, by means of a filtering,
  filtering of the depth maps of each image IV1 to IV3: the depth map is characterized, for each texture pixel, by a near or far depth value in the 3D scene. A threshold is defined, such that each pixel of an image IV1, IV2, IV3 which is located below this threshold is associated with an object in the scene which is close to the camera. All of the pixels located below this threshold are then considered to be the region of interest.

The processing data, such as the image data relating to the images IV1 to IV3, comprise the pixels inside their respective regions of interest, and pixels set to 0 corresponding, respectively, to the pixels located outside these regions of interest.

Additionally, data of text type are generated, for example in the form of marking information which indicates the setting to 0 of the pixels located outside the region of interest. The pixels set to 0 will be neither coded nor signaled to the decoder.

The image IV0 is coded using an HEVC coder, which generates a data signal F1 containing the information flag_proc=0 and the coded original data of the image IV0.

The image data of the region of interest of each image IV1, IV2, IV3 are coded using an HEVC coder, while the marking information is coded using a lossless coder.

Three data signals $F2_1$, $F2_2$, $F2_3$ which contain, respectively, the coded image data of the regions of interest of each of the images IV1, IV2, IV3 in association with the information flag_proc=1, and corresponding item of coded marking information, are generated. The data signals $F1_0$, $F2_1$, $F2_2$, $F2_3$ are concatenated, then transmitted to a decoder.

At the decoder, the information flag_proc is read.

If flag_proc=0, the image IV0 is reconstructed using an HEVC decoder, at its original resolution.

If flag_proc=1, each image IV1 to IV3, corresponding to the image data of its respective region of interest, is reconstructed by means of an HEVC decoder, using the marking information, which makes it possible to restore the value set to 0 of the pixels surrounding said region.

A synthesis algorithm may directly use the four images IV0, IV1, IV2, IV3 which have been reconstructed in order to generate an image of a view required by a user.

It goes without saying that the embodiments described above have been given purely by way of completely non-limiting indication, and that numerous modifications may be easily made by a person skilled in the art without otherwise departing from the scope of the invention.

The invention claimed is:

1. A method for coding an image of a view forming part of a plurality of views, the plurality of views simultaneously representing a 3D scene from different viewing angles or positions, implemented by a coding device, the method comprising:

selecting, from among first and second coding methods available for coding a current image of said view, one of said first and second coding methods for coding said current image of said view, said first coding method being used to code original data of said current image of said view and said second coding method being used to code processed original data of said current image of said view, generating a data signal containing information indicating whether the first coding method or the second coding method is selected, if the first coding method is selected, coding the original data of the current image of said view, said first coding method providing coded original data, if the second coding method is selected:
  coding processed original data of the current image of said view, said processed original data corresponding to at least one remaining region of the current image of said view, said remaining region having been obtained by a cropping applied to the original data of the current image of said view, said coding of the processed original data providing at least one coded remaining region,
  coding description information of said cropping, said description information of said cropping being information on a location, in the image of said view, of said remaining region,
  said generated data signal further containing:
    said coded original data of the current image of said view, if the first coding method has been selected,
    said coded remaining region of the current image of said view, and said coded description information of said cropping, if the second coding method has been selected.

2. The method as claimed in claim 1, wherein:
the remaining region of the current image of said view corresponds to pixels of the image of said view which have not been deleted following application of said cropping to the image of said view.

3. The method as claimed in claim 1, wherein:
the description information of said cropping comprises some coordinates of a pixel located at the top, the furthest to the left, in said remaining region of the image of said view, and some coordinates of another pixel located at the bottom, the furthest to the right, in the remaining region of the image of said view.

4. The method as claimed in claim 1, wherein:
the description information of said cropping contains a number of rows and/or columns of pixels deleted in the image of said view, and a position of said rows and/or columns in the image of said view.

5. The method as claimed in claim 1, wherein:
said cropping is configured to delete a fixed amount of pixels of the current image of said view.

6. A method for decoding a data signal representative of an image of a view forming part of a plurality of views, the plurality of views simultaneously representing a 3D scene from different viewing angles or positions, implemented by a decoding device, comprising the following:
  reading, in the data signal, an item of information indicating whether a current image of said view is to be decoded according to a first or a second decoding method, the first and second decoding methods being available for decoding said current image of said view, said first decoding method being used to decode coded original data associated with said current image of said view and said second decoding method being used to decode coded processed original data associated with said current image of said view,
  if the item of information indicates the first decoding method:
    reading, in the data signal, coded data associated with the current image of said view, said coded data corresponding to the coded original data of the image of said view,
    reconstructing the current image of said view on the basis of said coded original data,
  if the item of information indicates the second decoding method:
    reading, in the data signal:
      coded data associated with the current image of said view, said coded data corresponding to at least one remaining region of the image of said view which has been coded, said remaining region having been obtained by a cropping applied to the original data of the current image of said view,
      description information of said cropping, said description information of said cropping being information on a location, in the image of said view, of said remaining region,
    reconstructing the current image of said view on the basis of said coded remaining region and description information of said cropping.

7. The method as claimed in claim 6, wherein:
the remaining region of the current image of said view corresponds to pixels of the image of said view which have not been deleted following application of said cropping to the image of said view.

8. The method as claimed in claim 6, wherein:
the description information of said cropping comprises some coordinates of a pixel located at the top, the furthest to the left, in said remaining region of the image of said view, and some coordinates of another pixel located at the bottom, the furthest to the right, in the remaining region of the image of said view.

9. The method as claimed in claim 6, wherein:
the description information of said cropping contains a number of rows and/or columns of pixels deleted in the image of said view, and a position of said rows and/or columns in the image of said view.

10. A device for coding an image of a view forming part of a plurality of views, the plurality of views simultaneously representing a 3D scene from different viewing angles or positions, said coding device comprising:
  a processor which is configured to implement:
  selecting from among first and second coding methods available for coding the data of a current image of said view, one of said first and second coding methods for coding said current image of said view, said first coding method being used to code original data of said current image of said view and said second coding method being used to code processed original data of said current image of said view,
  generating a data signal containing information indicating whether the first coding method or the second coding method is selected,
  if the first coding method is selected, coding the original data of the current image of said view, said first coding method providing coded original data,
  if the second coding method is selected:
    coding processed original data of the current image of said view, said processed original data corresponding to at least one remaining region of the current image of said view, said remaining region having been obtained by a cropping applied to the original data of the current image of said view, said coding of the processed original data providing at least one coded remaining region, coding description information of said cropping, said description information being information on a location, in the image of said view, of said remaining region, said generated data signal further containing:

said coded original data of the current image of said view, if the first coding method has been selected, said coded remaining region of the current image of said view, and said coded description information of said cropping, if the second coding method has been selected.

11. A device for decoding a data signal representative of an image of a view forming part of a plurality of views, the plurality of views simultaneously representing a 3D scene from different viewing angles or positions, said decoding device comprising:

a processor which is configured to implement:

reading, in the data signal, an item of information indicating whether a current image of said view is to be decoded according to a first or a second decoding method, the first and second decoding methods being available for decoding said current image of said view, said first decoding method being used to decode coded original data associated with said current image of said view and said second decoding method being used to decode coded processed original data associated with said current image of said view, if the item of information indicates the first decoding method:

reading, in the data signal, coded data associated with the current image of said view, said coded data corresponding to the coded original data of the image of said view, reconstructing the current image of said view on the basis of said coded original data, if the item of information indicates the second decoding method:

reading, in the data signal:

coded data associated with the current image of said view, said coded data corresponding to at least one remaining region of the image of said view which has been coded, said remaining region having been obtained by a cropping applied to the original data of the current image of said view, description information of said cropping, said description information of said cropping being information on a location, in the image of said view, of said remaining region, reconstructing the current image of the view on the basis of said coded remaining region and description information of said cropping.

12. A non-transitory computer-readable medium comprising a computer program stored thereon comprising program code instructions for executing a method for coding an image of a view forming part of a plurality of views, when the instructions are executed on a processor of a coding device, the plurality of views simultaneously representing a 3D scene from different viewing angles or positions, wherein the instructions configure the coding device to:

select from among first and second coding methods available for coding a current image of said view, one of said first and second coding methods for coding said image of said current view, said first coding method being used to code original data of said current image of said view and said second coding method being used to code processed original data of said current image of said view, generate a data signal containing information indicating whether the first coding method or the second coding method is selected, if the first coding method is selected, code the original data of the current image of said view, said first coding method providing coded original data, if the second coding method is selected:

code processed original data of the current image of said view, said processed original data corresponding to at least one remaining region of the current image of said view, said remaining region having been obtained by said image processing applied to the original data of the current image of said view, said coding of said processed original data providing at least one coded remaining region, code description information of said cropping, said description information of said cropping being information on a location, in the image of said view, of said remaining region, said generated data signal further containing:

said coded original data of the current image of said view, if the first coding method has been selected, said coded remaining region of the current image of said view, and said coded description information of said cropping, if the second coding method has been selected.

13. A non-transitory computer-readable medium comprising a computer program stored thereon comprising program code instructions for executing a method for decoding a data signal representative of an image of a view forming part of a plurality of views, when the instructions are executed on a processor of a decoding device, the plurality of views simultaneously representing a 3D scene from different viewing angles or positions, wherein the instructions configure the decoding device to:

read, in the data signal, an item of information indicating whether a current image of said view is to be decoded according to a first or a second decoding method, the first and second decoding methods being available for decoding said current image of said view, said first decoding method being used to decode coded original data associated with said current image of said view and said second decoding method being used to decode coded processed original data associated with said current image of said view, if the item of information indicates the first decoding method:

read, in the data signal, coded data associated with the current image of said view, said coded data corresponding to the coded original data of the image of said view, reconstruct the current image of said view on the basis of said coded original data, if the item of information indicates the second decoding method:

read, in the data signal:

coded data associated with the current image of said view, said coded data corresponding to at least one remaining region of the image of said view which has been coded, said remaining region having been obtained by a cropping applied to the original data of the current image of said view, description information of said cropping, said description information of said cropping being information on a location, in the image of said view, of said remaining region, reconstruct the current image of the view on the basis of said coded remaining region and description information of said cropping.

* * * * *